(12) United States Patent
Park et al.

(10) Patent No.: US 12,542,933 B2
(45) Date of Patent: Feb. 3, 2026

(54) IN-LOOP FILTERING IN MAPPING-BASED VIDEO CODING

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Sea Nae Park, Seoul (KR); Joo Hyung Byeon, Seoul (KR); Dong Gyu Sim, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/737,419

(22) Filed: Jun. 7, 2024

(65) Prior Publication Data
US 2024/0333979 A1    Oct. 3, 2024

Related U.S. Application Data

(63) Continuation of application No. PCT/KR2022/017026, filed on Nov. 2, 2022.

(30) Foreign Application Priority Data

Dec. 17, 2021   (KR) .................. 10-2021-0181830
Nov. 1, 2022    (KR) .................. 10-2022-0143933

(51) Int. Cl.
  *H04N 19/82*  (2014.01)
  *H04N 19/117* (2014.01)
  (Continued)

(52) U.S. Cl.
  CPC .......... *H04N 19/82* (2014.11); *H04N 19/117* (2014.11); *H04N 19/124* (2014.11);
  (Continued)

(58) Field of Classification Search
  None
  See application file for complete search history.

(56) References Cited

U.S. PATENT DOCUMENTS 9,300,982 B2   3/2016   Park
9,313,499 B2   4/2016   Narroschke
(Continued)

FOREIGN PATENT DOCUMENTS

KR   20170058870 A    5/2017
KR   102061214 B1   12/2019
(Continued)

OTHER PUBLICATIONS

International Search Report and Written Opinion cited in corresponding international patent application No. PCT/KR2022/017026; Feb. 28, 2023; 10 pp.

*Primary Examiner* — Clifford Hilaire
(74) *Attorney, Agent, or Firm* — Lempia Summerfield Katz LLC

(57) ABSTRACT

A method and an apparatus are disclosed for in-loop filtering in mapping-based video coding. A video coding method and an apparatus compensate for variations in signal characteristics between blocks or within a block by using in-loop filtering when original signals or residual signals are mapped in a particular way and then video encoding or video decoding is performed.

14 Claims, 22 Drawing Sheets

(51) Int. Cl.
*H04N 19/124* (2014.01)
*H04N 19/167* (2014.01)
*H04N 19/176* (2014.01)
*H04N 19/86* (2014.01)

(52) U.S. Cl.
CPC ......... *H04N 19/167* (2014.11); *H04N 19/176* (2014.11); *H04N 19/86* (2014.11)

(56) References Cited

U.S. PATENT DOCUMENTS

| | | | |
|---|---|---|---|
| 9,414,064 | B2 | 8/2016 | Narroschke |
| 9,565,453 | B2 | 2/2017 | Park |
| 9,961,371 | B2 | 5/2018 | Narroschke |
| 9,992,515 | B2 | 6/2018 | Park |
| 10,531,126 | B2 | 1/2020 | Park |
| 10,587,895 | B2 | 3/2020 | Narroschke |
| 10,798,421 | B2 | 10/2020 | Park |
| 10,924,764 | B2 | 2/2021 | Narroschke |
| 10,924,767 | B2 | 2/2021 | Park |
| 11,277,623 | B2 | 3/2022 | Yin |
| 11,375,188 | B2 | 6/2022 | Zhang |
| 11,418,815 | B2 | 8/2022 | Park |
| 11,463,731 | B2 | 10/2022 | Narroschke |
| 11,671,630 | B2 | 6/2023 | Park |
| 11,895,335 | B2 | 2/2024 | Narroschke |
| 2013/0182764 | A1 | 7/2013 | Narroschke |
| 2013/0343456 | A1 | 12/2013 | Narroschke |
| 2014/0119433 | A1 | 5/2014 | Park |
| 2015/0229972 | A1 | 8/2015 | Park |
| 2016/0150248 | A1 | 5/2016 | Narroschke |
| 2016/0150249 | A1 | 5/2016 | Narroschke |
| 2016/0337642 | A1 | 11/2016 | Park |
| 2018/0288442 | A1 | 10/2018 | Park |
| 2020/0112748 | A1 | 4/2020 | Narroschke |
| 2020/0120361 | A1 | 4/2020 | Park |
| 2020/0413104 | A1 | 12/2020 | Park |
| 2021/0084307 | A1 | 3/2021 | Yin |
| 2021/0136417 | A1 | 5/2021 | Narroschke |
| 2021/0144410 | A1 | 5/2021 | Park |
| 2022/0070455 | A1* | 3/2022 | Zhang ................. H04N 19/635 |
| 2022/0103815 | A1 | 3/2022 | Zhang |
| 2022/0279178 | A1 | 9/2022 | Zhang |
| 2022/0353541 | A1 | 11/2022 | Park |
| 2022/0417560 | A1 | 12/2022 | Narroschke |
| 2023/0089002 | A1* | 3/2023 | Laroche ................. H04N 19/30 375/240.02 |
| 2024/0146967 | A1 | 5/2024 | Narroschke |

FOREIGN PATENT DOCUMENTS

| | | |
|---|---|---|
| KR | 20210043747 A | 4/2021 |
| KR | 20210139272 A | 11/2021 |

* cited by examiner

— Target Boundary For Deblocking Filtering      Target Region For Deblocking Filtering — Target Boundary For Deblocking Filtering      Target Region For Deblocking Filtering — Target Boundary For Deblocking Filtering      Target Region For Deblocking Filtering

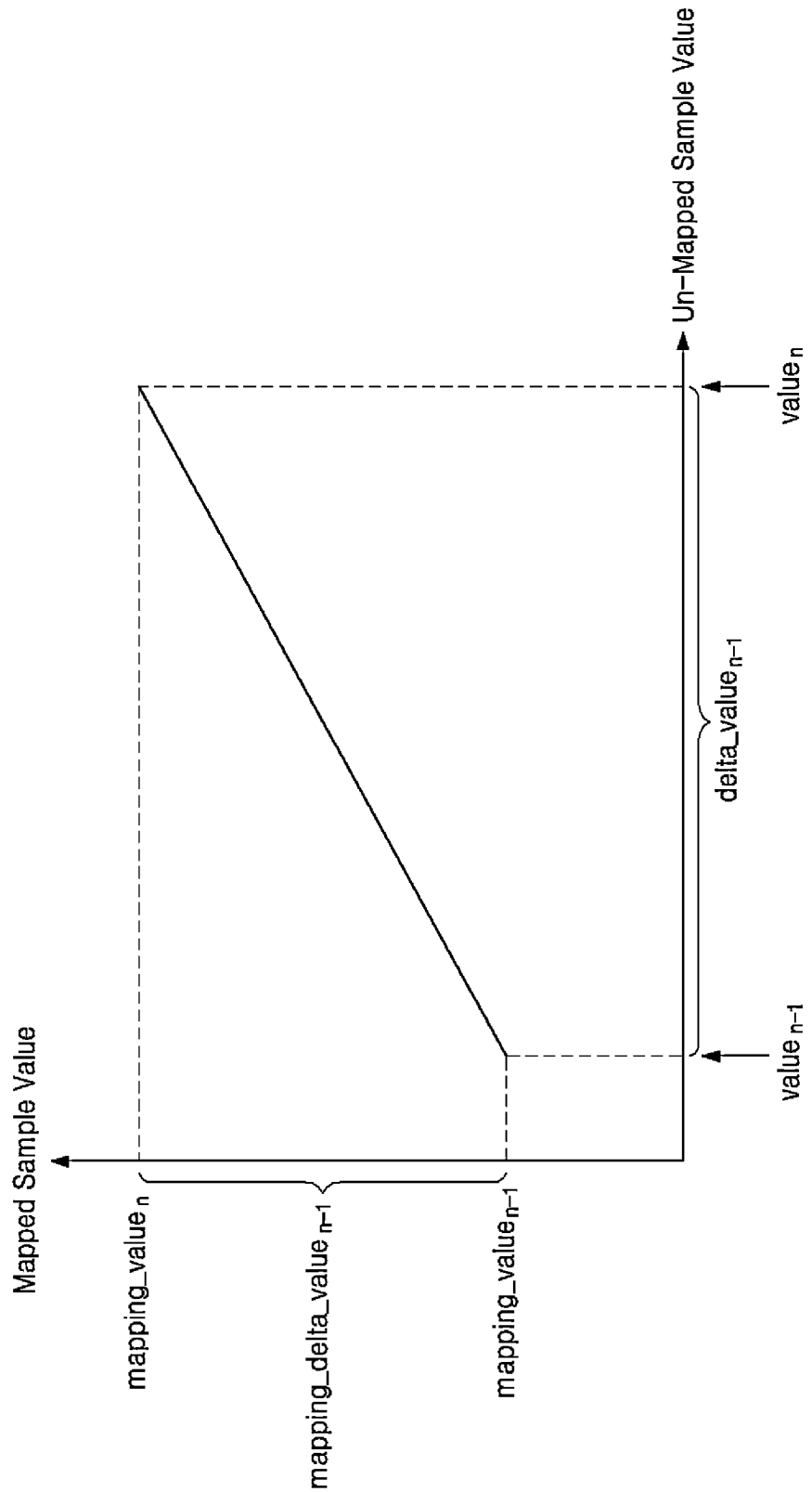

IN-LOOP FILTERING IN MAPPING-BASED VIDEO CODING

CROSS-REFERENCE TO RELATED APPLICATIONS

This application is a continuation of International Application No. PCT/KR2022/017026 filed on Nov. 2, 2022, which claims priority to and the benefit of Korean Patent Application No. 10-2021-0181830, filed on Dec. 17, 2021, and Korean Patent Application No. 10-2022-0143933, filed on Nov. 1, 2022, the entire contents of each of which are incorporated herein by reference.

TECHNICAL FIELD

The present disclosure relates to in-loop filtering in mapping-based video coding.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

To effectively compress a video image, a mapping may be applied to the original signals or residual signals to change the range of sample values, and then encoding or decoding may be performed. When the original signals or residual signals are mapped in a certain way and then encoded or decoded, the coding efficiency may be increased, but changes in signal characteristics between blocks or within blocks may occur during the mapping and transform process. Therefore, to enhance video quality and improve coding efficiency, there is a need for a method of dealing with such changes in signal characteristics.

SUMMARY

The present disclosure seeks to provide a video coding method and an apparatus for compensating for variations in signal characteristics between or within blocks by using in-loop filtering when original signals or residual signals are mapped in a particular way and then video encoding or video decoding is performed.

At least one aspect of the present disclosure provides a method of performing in-loop filtering by a video decoding device. The method includes determining a target region for deblocking filtering centered on a boundary between blocks in a reconstructed image. The method also includes determining whether a mapping relation is to be applied to pixels in the target region. When the mapping relation is applied, the method further includes decoding information on the mapping relation, calculating a mapping offset by using the information on the mapping relation, and performing the deblocking filtering on the target region by using the mapping offset.

Another aspect of the present disclosure provides a method of performing in-loop filtering by a video encoding device. The method includes determining a target region for deblocking filtering centered on a boundary between blocks in a reconstructed image. The method also includes determining whether a mapping relation is to be applied to pixels in the target region. When the mapping relation is applied, the method further includes determining information on the mapping relation, calculating a mapping offset by using the information on the mapping relation, performing the deblocking filtering on the target region by using the mapping offset, and encoding the information on the mapping relation.

Yet another aspect of the present disclosure provides a computer-readable recording medium storing a bitstream generated by a video encoding method. The video encoding method includes determining a target region for deblocking filtering centered on a boundary between blocks in a reconstructed image. The video encoding method also includes determining whether a mapping relation is to be applied to pixels in the target region. When the mapping relation is applied, the video encoding method further includes determining information on the mapping relation, calculating a mapping offset by using the information on the mapping relation, performing the deblocking filtering on the target region by using the mapping offset, and encoding the information on the mapping relation.

As described above, the present disclosure provides a video coding method and an apparatus that compensate for changes in signal characteristics between blocks or within a block by using in-loop filtering when original signals or residual signals are mapped in a particular way and then video encoding or video decoding is performed. Thus, the video coding method and the apparatus improve video coding efficiency and enhance video quality.

BRIEF DESCRIPTION OF THE DRAWINGS

FIGS. 12A-12D are diagrams illustrating mapping relations and inverse mapping relations between un-mapped sample values and mapped sample values, according to at least one embodiment of the present disclosure.

DETAILED DESCRIPTION

Figure 1:
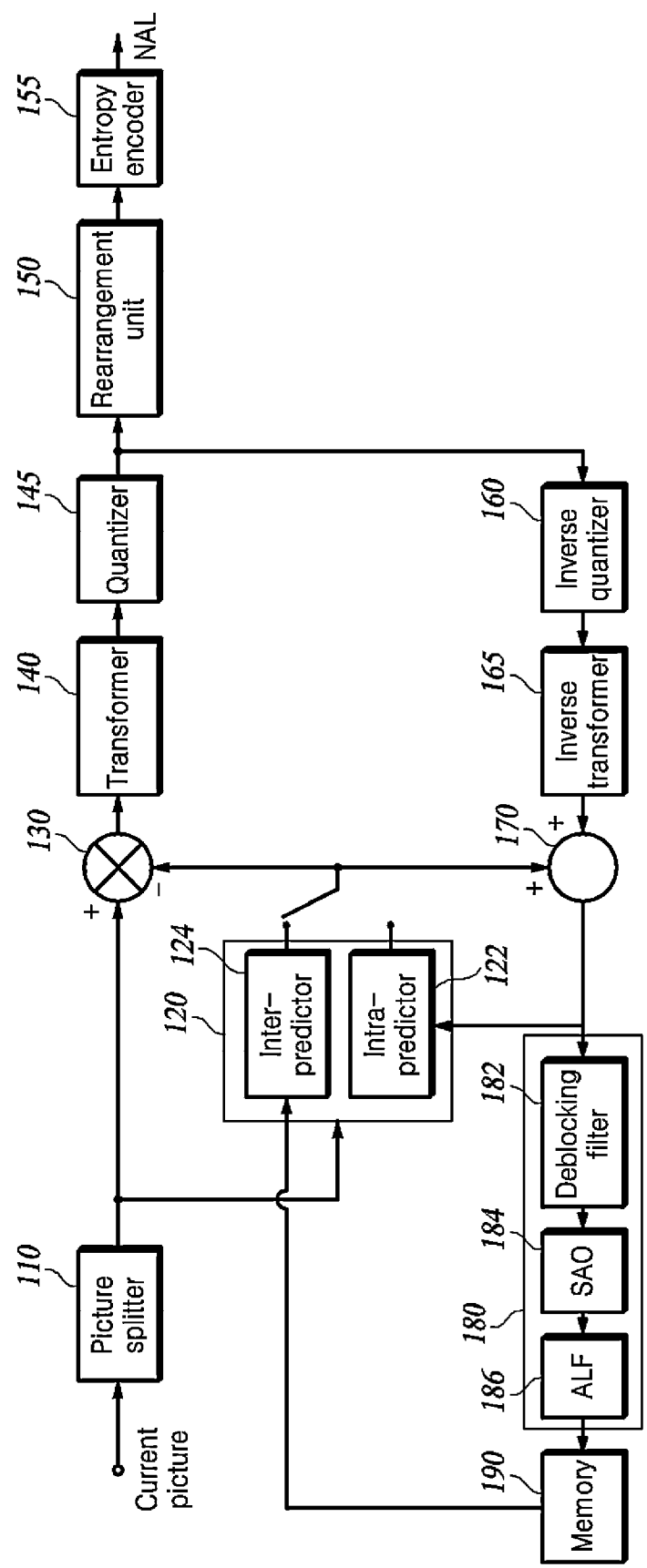
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
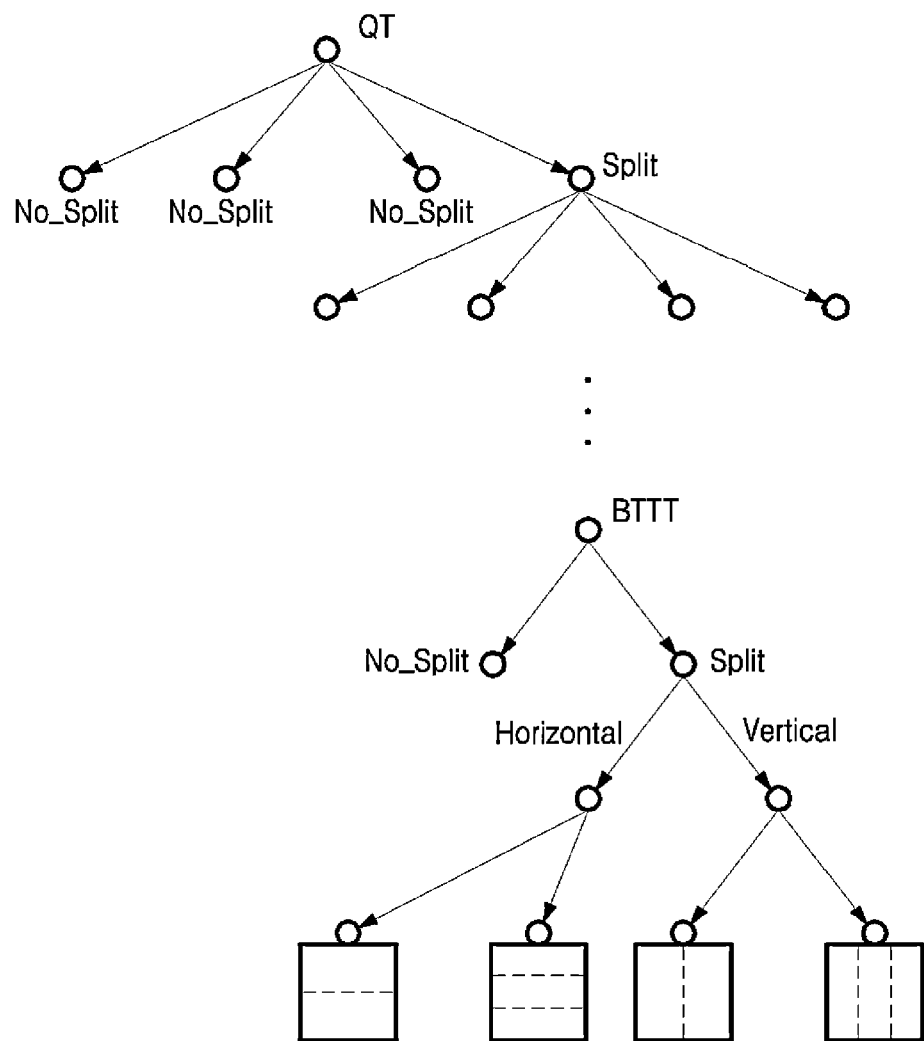
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
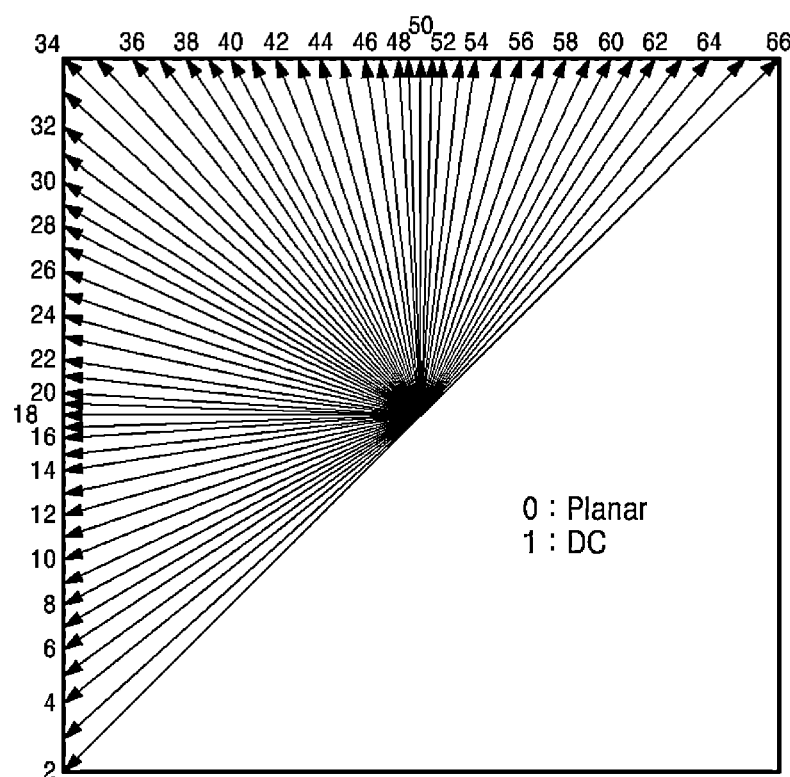
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
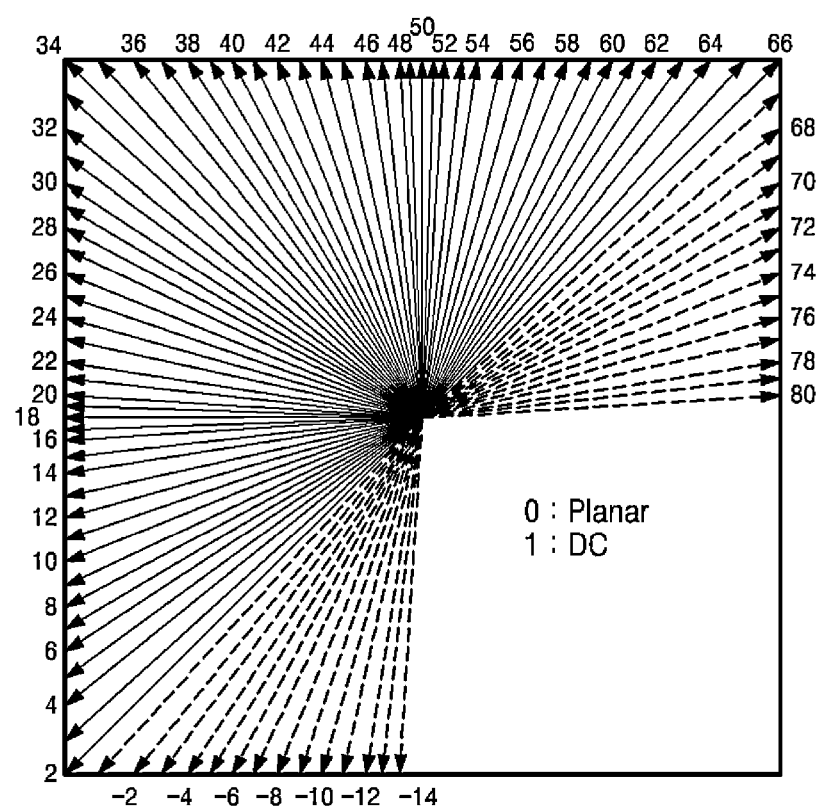

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
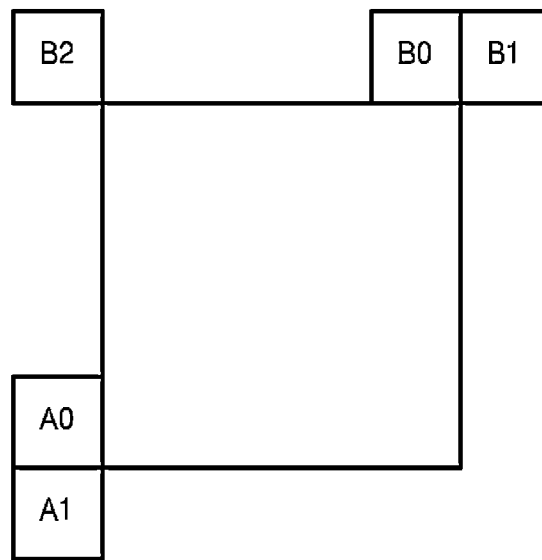
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
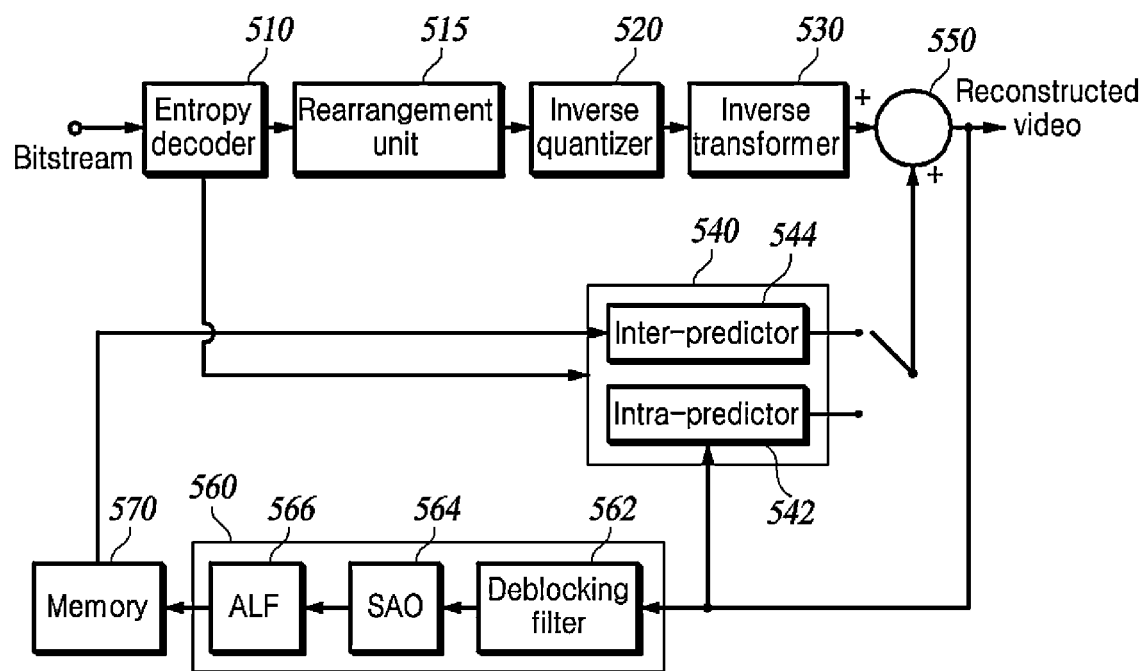
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that compensate for variations in signal characteristics between blocks or within a block by using in-loop filtering when original signals or residual signals are mapped in a particular way and then video encoding or video decoding is performed.

The following embodiments may be performed by the loop filter unit 180 in the video encoding device. The following embodiments may also be performed by the loop filter unit 560 in the video decoding device.

The video encoding device when encoding the current block may generate signaling information associated with the present embodiments in terms of optimizing rate distortion. The video encoding device may use the entropy encoder 155 to encode the signaling information and may transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Applying Mapping Relation to the Original Samples or Residual Samples

Figure 6:
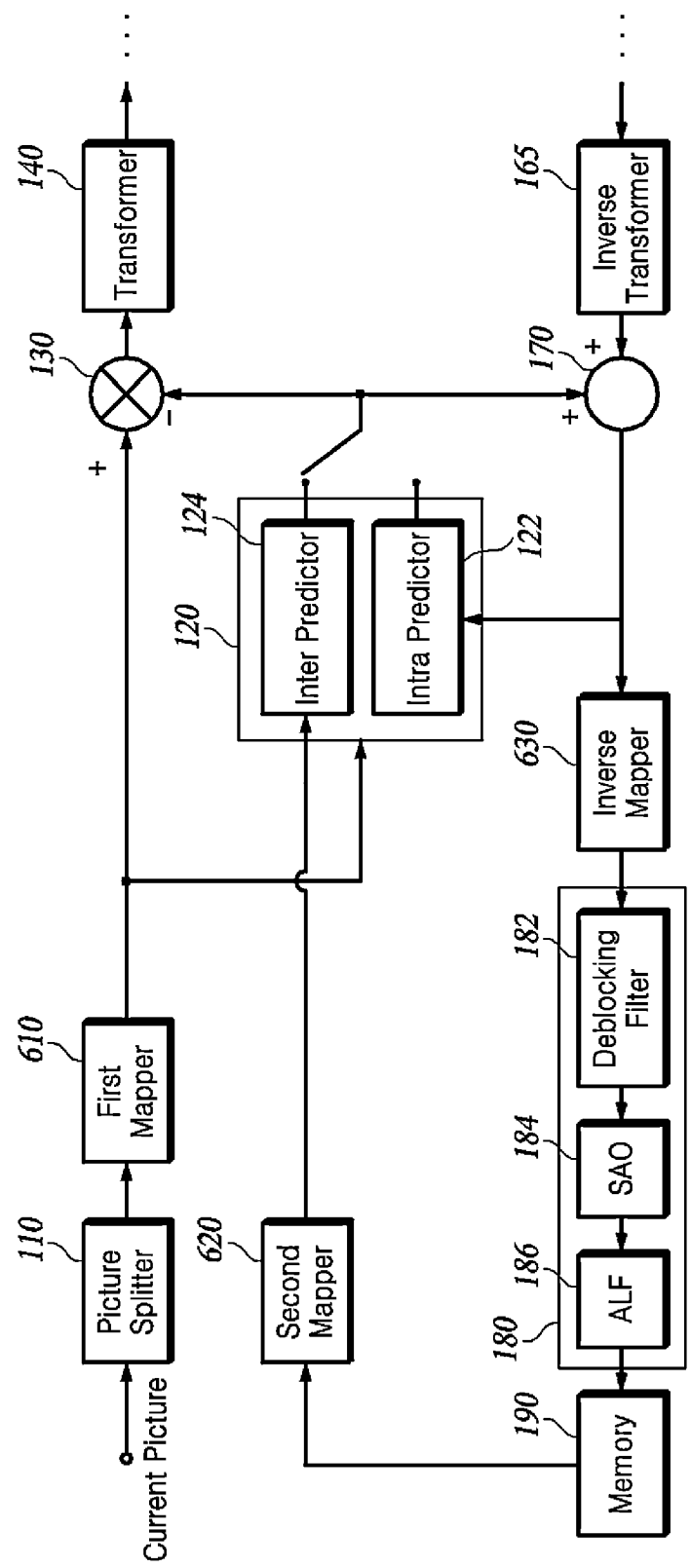
FIG. 6 is a block diagram conceptually illustrating a mapping-based video encoding device according to at least one embodiment of the present disclosure.

FIG. 6 is a block diagram conceptually illustrating a mapping-based video encoding device according to at least one embodiment of the present disclosure.

The video encoding device according to this embodiment performs adaptive mapping on luma and chroma samples and uses the mapped luma and chroma samples to encode the current block. In addition to the components included in the embodiment illustrated in FIG. 1, the video encoding device may include a first mapper 610, a second mapper 620, and an inverse mapper 630. The following description focuses on components that are related to or have added functionality of mapping-based encoding.

The first mapper 610 operates upon the current block in the current image to use a mapping relation for mapping sample values in the original range to sample values in the mapping range. Here, the original sample image range represents a range containing sample values of the original image, and the mapping range corresponds to the original range and is generated by the mapping relation. The mapped current block may be transferred to the predictor 120 for intra/inter prediction, as illustrated in FIG. 6, or may be transferred to the subtractor 130 for the generation of a residual block.

The second mapper 620 operates upon the reference picture to use a mapping relation for mapping reference samples to sample values in the mapping range. Since the respective pictures may be encoded by using different mapping relations for each picture, when mapping is applied, the video encoding device may utilize the mapping relation used to encode the reference picture. Thus, the mapping relation applied to the reference picture may be different from the mapping relation applied to the current block.

The mapped reference picture is transferred to the inter predictor 124. The inter predictor 124 uses a motion prediction process and a motion compensation process to search for a prediction block of the current block within the reference picture. As described above, the motion vector corresponds to the displacement between the current block and the prediction block.

Sample values in the mapping range, generated by the first mapper 610 and the second mapper 620, are used by the transformer 140, quantizer 145, entropy encoder 155, inverse quantizer 160, inverse transformer 165, and predictor 120, as illustrated in FIG. 6.

The inverse mapper 630 operates upon the reconstructed block generated by the adder 170 to use the inverse mapping relation of the first mapping relation described above for inversely mapping the reconstructed sample values to the sample values in the original range.

The sample values in the original range, generated by the inverse mapper 630, are used by the loop filter unit 180 and the memory 190, as illustrated in FIG. 6.

Figure 7:
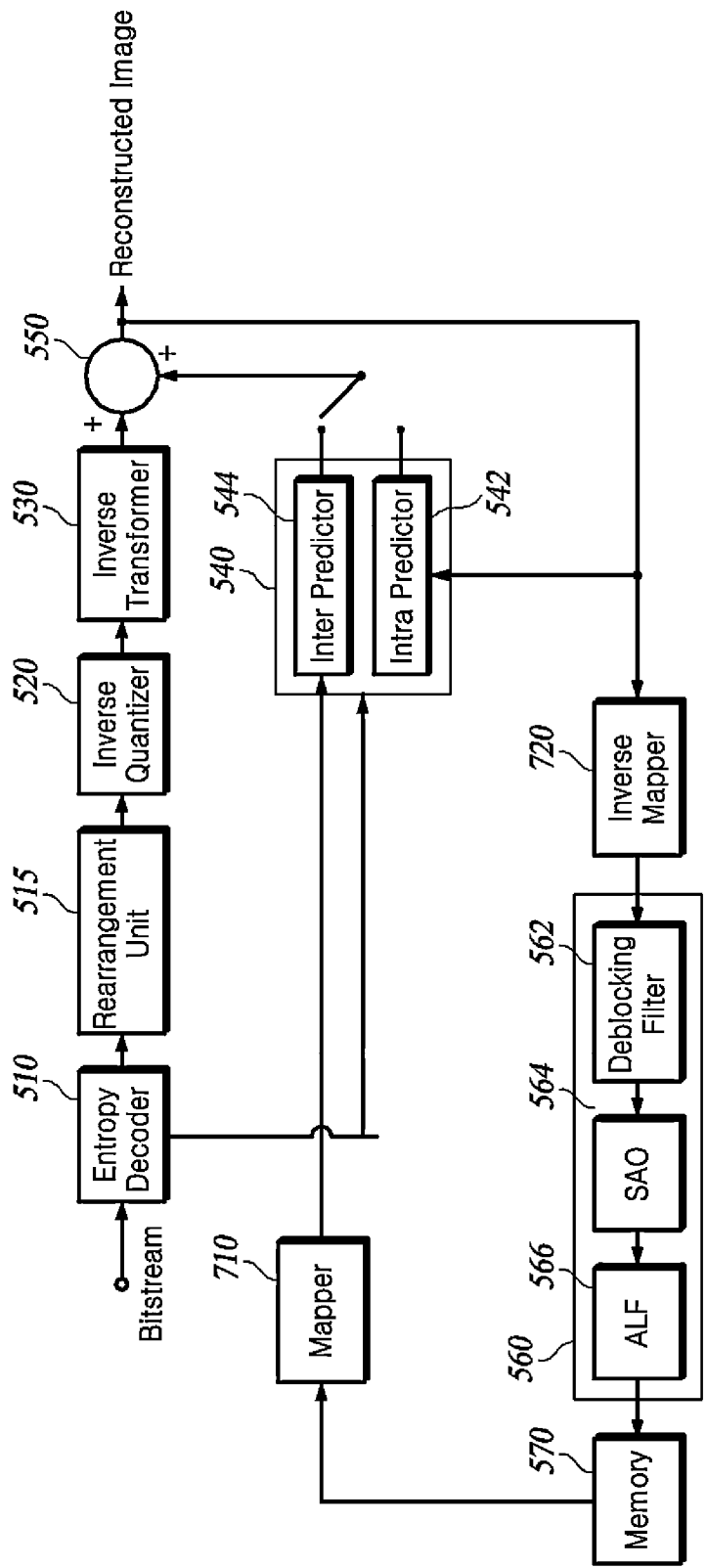
FIG. 7 is a block diagram conceptually illustrating a mapping-based video decoding device according to at least one embodiment of the present disclosure.

FIG. 7 is a block diagram conceptually illustrating a mapping-based video decoding device according to at least one embodiment of the present disclosure.

The video decoding device according to this embodiment performs adaptive mapping on luma and chroma samples and decodes the current block by using the mapped luma and chroma samples. In addition to the components included in the embodiment illustrated in FIG. 5, the video decoding device may include a mapper 710 and an inverse mapper 720. The following description focuses on components that are related to or add functionality of mapping-based decoding.

The mapper 710 operates upon a reference picture to use a mapping relation of the reference picture for mapping reference samples to sample values in a mapping range. For example, when each picture was encoded by the video encoding device by using different mapping relations for each picture and a corresponding mapping relation has been transmitted, and when mapping is applied, the video decoding device may utilize the mapping relation used for decoding the reference picture.

The mapped reference picture is transferred to the inter predictor 544. The inter predictor 544 generates a prediction block of the current block in the reference picture by using the motion vector. Meanwhile, the sample values in the mapping range transferred from the video encoding device are used by the entropy decoder 510, inverse quantizer 520, inverse transformer 530, and intra predictor 542.

The inverse mapper 720 operates upon the reconstructed block generated by the adder 550 to use the inverse mapping relation for inversely mapping the reconstructed sample values to the sample values in the original range. As described above, when different mapping relations are utilized for different pictures, the mapping relation corresponding to the inverse mapping relation utilized by the inverse mapper 720 may be different from the mapping relation of the reference picture, utilized by the mapper 710.

The sample values in the original range, generated by the inverse mapper 720, are used by the loop filter unit 560 and the memory 570, as illustrated in FIG. 7.

In the following description, the sample values in the original range may be used interchangeably with the original sample values, and the sample values in the mapping range may be used interchangeably with the mapped sample values. Further, samples in the original range may be used interchangeably with the original samples, and samples in the mapping range may be used interchangeably with the mapping samples.

Figure 8:
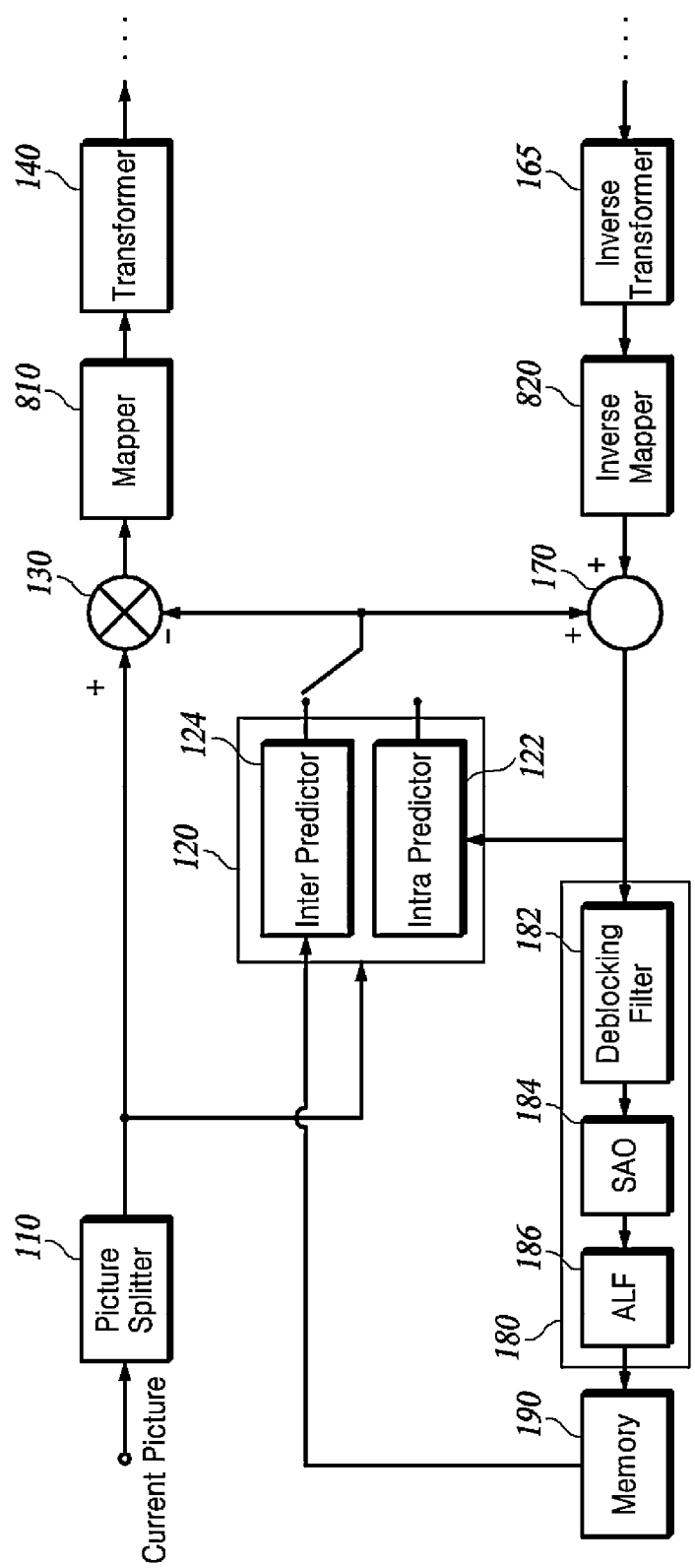
FIG. 8 is a block diagram conceptually illustrating a mapping-based video encoding device according to another embodiment of the present disclosure.

FIG. 8 is a block diagram conceptually illustrating a mapping-based video encoding device according to another embodiment of the present disclosure.

The video encoding device according to this embodiment performs adaptive mapping on residual samples of the current block in the current image and encodes the mapped residual samples. In addition to the components included in the embodiment illustrated in FIG. 1, the video encoding device may include a mapper 810 and an inverse mapper 820. The following description focuses on components that are related to or have added functionality for mapping the residual samples.

The mapper 810 operates upon the residual samples of the current block to use a mapping relation for mapping sample values in a residual range to sample values in a mapping range. Here, the residual range indicates a range that includes the residual sample values. The mapping range is the range containing the mapped sample values, which corresponds to the residual range and is generated by the mapping relation. The mapped residual samples are transferred to the transformer 140 for quantization.

The sample values in the mapping range, generated by the mapper 810, are used by the transformer 140, quantizer 145, entropy encoder 155, inverse quantizer 160, and the inverse transformer 165, as partially illustrated in FIG. 8.

The inverse mapper 820 operates upon the inverse transformed samples generated by the inverse transformer 165 to use an inverse mapping relation that is inverse to the mapping relation described above for inversely mapping the inverse transformed sample values to sample values in the residual range.

The sample values in the residual sample range, generated by the inverse mapper 820, are used in the adder 170, as illustrated in FIG. 8.

Figure 9:
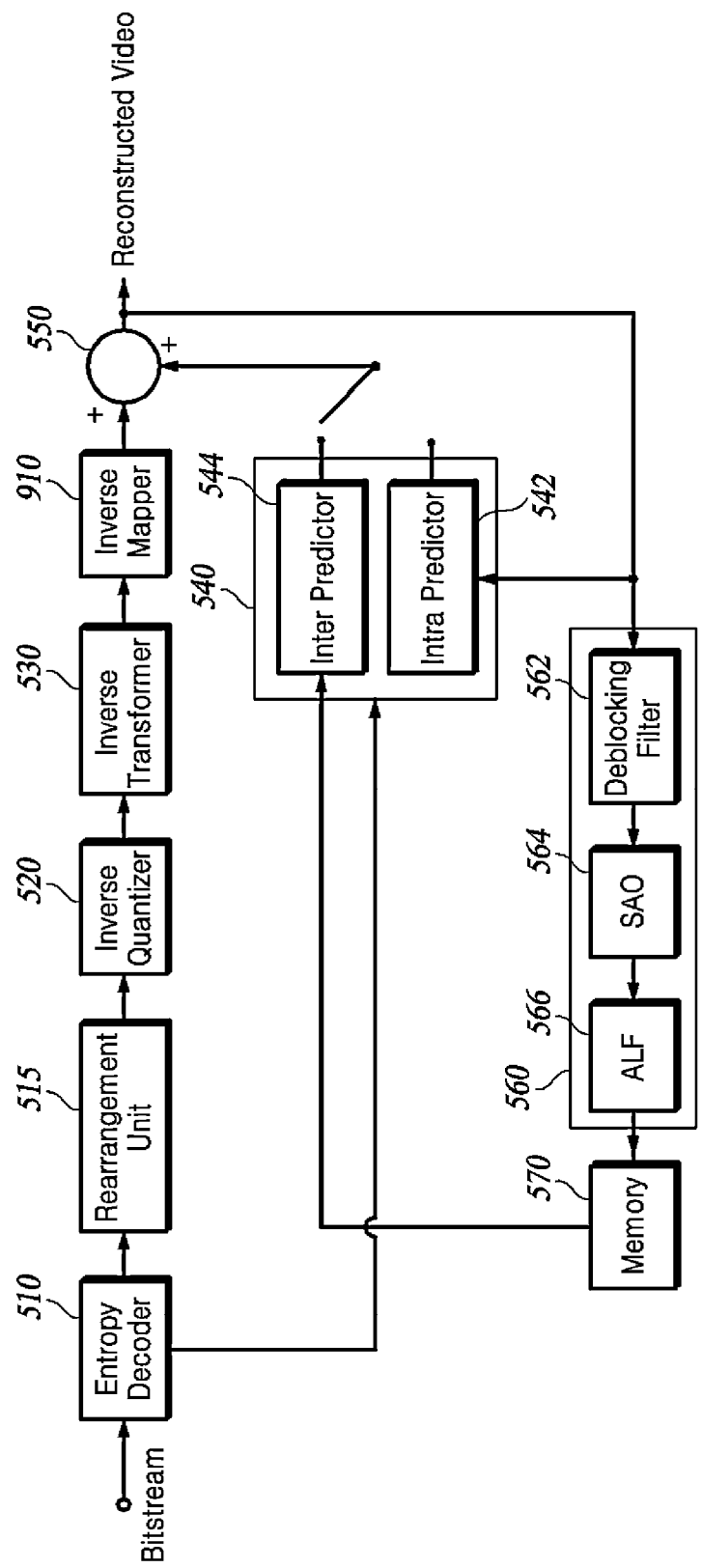
FIG. 9 is a block diagram conceptually illustrating a mapping-based video decoding device according to another embodiment of the present disclosure.

FIG. 9 is a block diagram conceptually illustrating a mapping-based video decoding device according to another embodiment of the present disclosure.

The video decoding device according to this embodiment may perform adaptive inverse mapping on residual samples of the current block and may decode the current block by using the inverse-mapped residual samples. In addition to the components included in the embodiment illustrated in FIG. 5, the video decoding device may include an inverse mapper 910. The following description focuses on components related to or having added functions for the inverse mapping of the residual signals.

The inverse mapper 910 operates upon the inverse transformed samples generated by the inverse transformer 530 to use an inverse mapping relation to the mapping relation described above for inversely mapping the inverse transformed sample values to sample values in the residual range.

The sample values in the residual range, generated by the inverse mapper 910, are used by the adder 550, as illustrated in FIG. 9.

In the following description, the sample values in the residual range may be used interchangeably with the residual sample values, and the sample values in the mapping range may be used interchangeably with the mapped sample values. Further, the samples in the residual range may be used interchangeably with the residual samples, and the samples in the mapping range may be used interchangeably with the mapping samples.

Further, the original range or residual range before the mapping is applied is expressed as the un-mapped range.

The original sample value or residual sample value before the mapping is applied is expressed as the un-mapped sample value. The original samples or residual samples before the mapping is applied are represented by the un-mapped samples. The following describes embodiments for utilizing deblocking filters and SAO filters to compensate for changes in signal characteristics between or within blocks in a reconstructed image. The following embodiments are described regarding the video encoding device for convenience but may be equally applicable to the video decoding device.

II. Deblocking Filter and SAO Filter According to Embodiments

Figure 10:
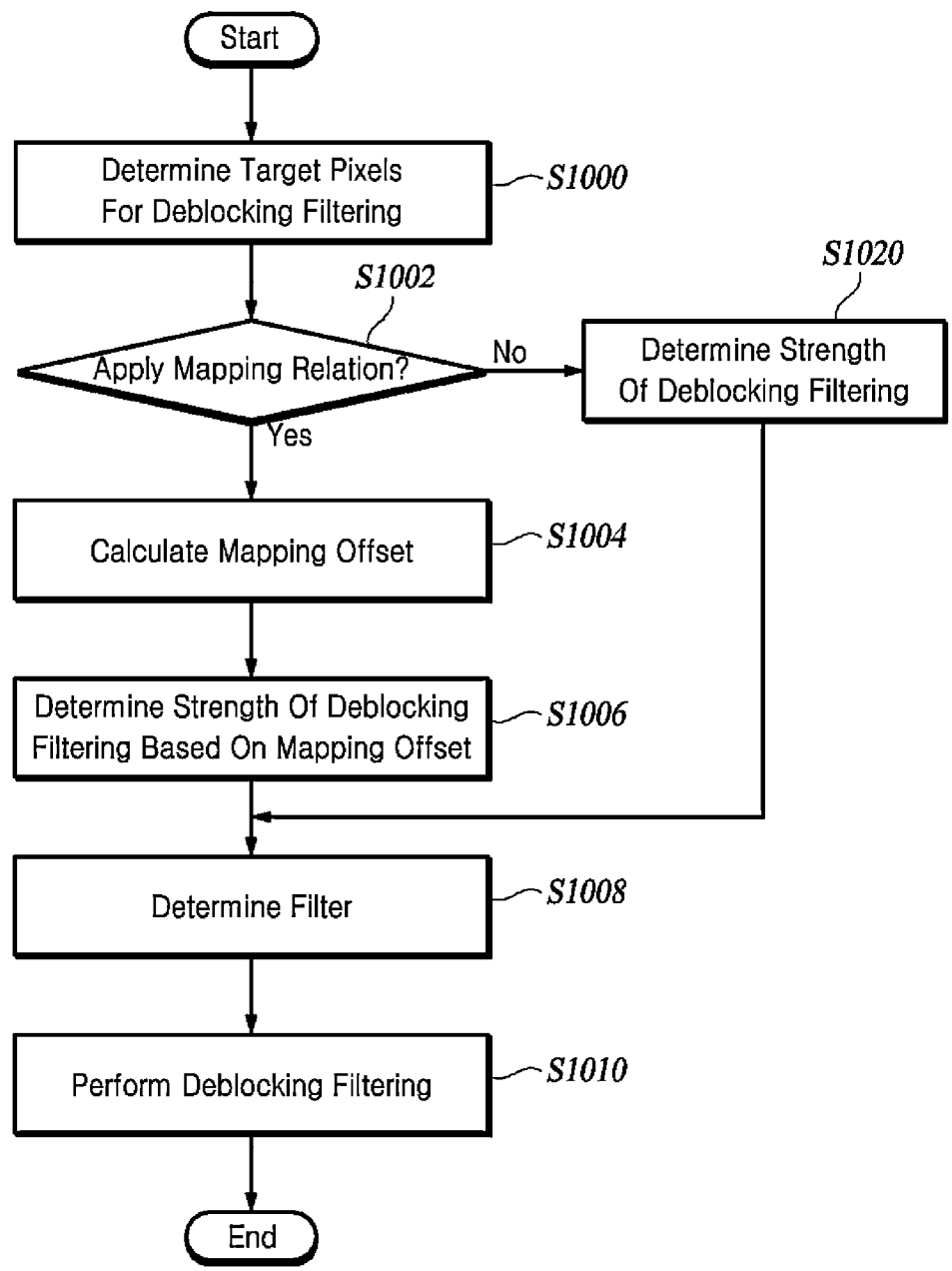
FIG. 10 is a flowchart of a deblocking filtering method according to at least one embodiment of the present disclosure.

FIG. 10 is a flowchart of a deblocking filtering method according to at least one embodiment of the present disclosure.

The deblocking filter 182 determines target pixels for deblocking filtering (S1000).

Figure 11A:
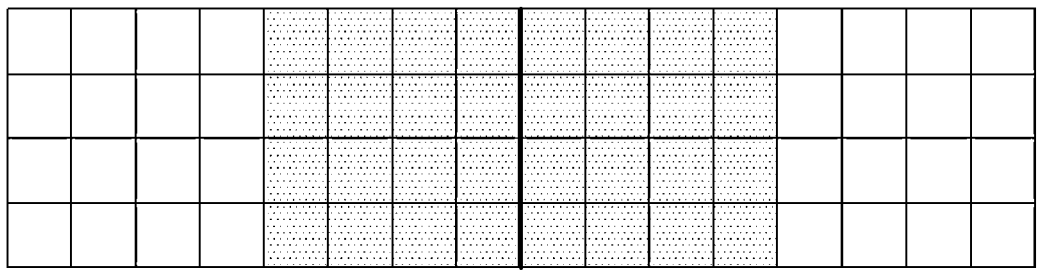
FIGS. 11A-11D are diagrams illustrating deblocking filtering target regions according to at least one embodiment of the present disclosure.
Figure 11A:

The deblocking filter 182 may determine, based on an arrangement between the video encoding device and the video decoding device, target pixels for deblocking filtering, i.e., target regions, centered on a boundary between blocks in the reconstructed image, as illustrated in FIG. 11A. Depending on embodiments, deblocking filtering may be applied to pixels contained in slices, tiles, frames, and the like in the symmetrical regions centered on all boundaries based on a block of a predetermined size. Further, based on an arrangement between the video encoding device and the video decoding device, the deblocking filter 182 may adaptively determine the target pixels based on the size of the target block, prediction mode, prediction partition mode, type of transform kernel, presence or absence of transform encoding, presence or absence of quantization, whether or not to perform mapping, and the like.

Figure 11B:
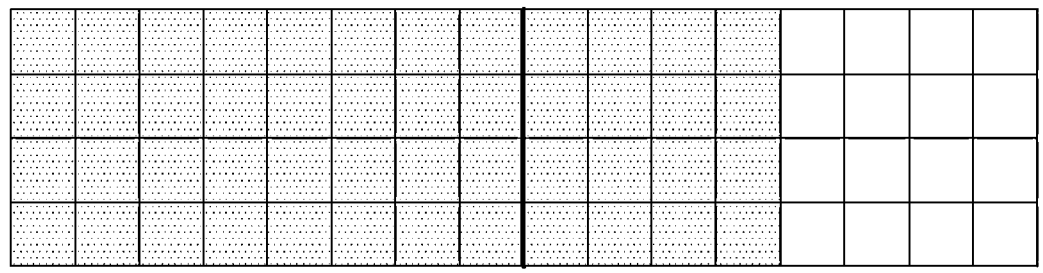
Figure 11B:
Figure 11C:
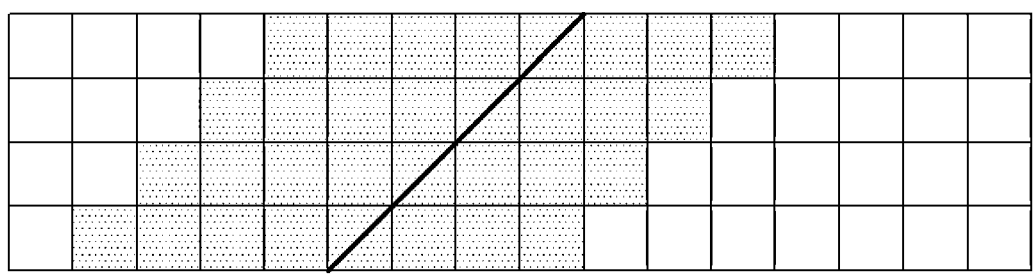
Figure 11C:
Figure 11D:
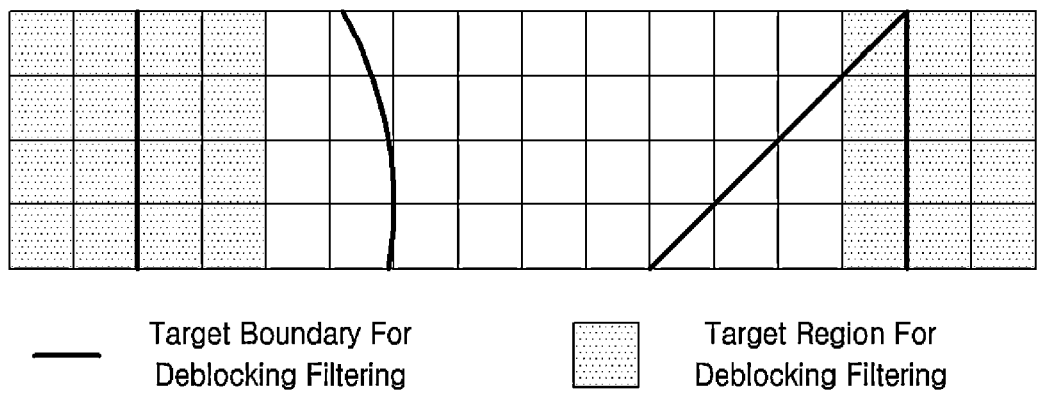

In other embodiments, the region that is subject to the deblocking filter may be asymmetrical around its boundary, as in the example of FIG. 11B. Alternatively, with boundaries between blocks that are not square/rectangular, the region to apply the deblocking filter may be shaped like the example in FIG. 11C. Alternatively, as in the example of FIG. 11D, if the target blocks satisfy a minimum unit determined by an arrangement between the video encoding device and the video decoding device, but the boundary between the target blocks is curved or oblique, the target region for deblocking filtering may not be determined. Namely, at the curved or oblique boundary in the example of FIG. 11D, no deblocking filtering is performed.

Meanwhile, the video encoding device may selectively determine deblocking filtering by transmitting an on/off flag indicating whether or not to apply the deblocking filter. The on/off flag may be transmitted in one or more of the units of a block with a minimum unit size to which the deblocking filter is applied, a prediction block, a transform block, a CTU, a slice, a frame, a group of slices, and a group of frames.

The deblocking filter 182 determines whether the mapping relation is to be applied to the target pixels for the deblocking filtering (S1002).

In one example, the video encoding device may determine a flag indicating whether the mapping relation applies and may signal the flag to the video decoding device.

Alternatively, the deblocking filter 182 may utilize information on the target region and may utilize neighboring pixels of the target region, to determine whether the mapping relation is applied.

FIGS. 12A-12D are diagrams illustrating mapping relations and inverse mapping relations between un-mapped sample values and mapped sample values, according to at least one embodiment of the present disclosure.

Figure 12A:
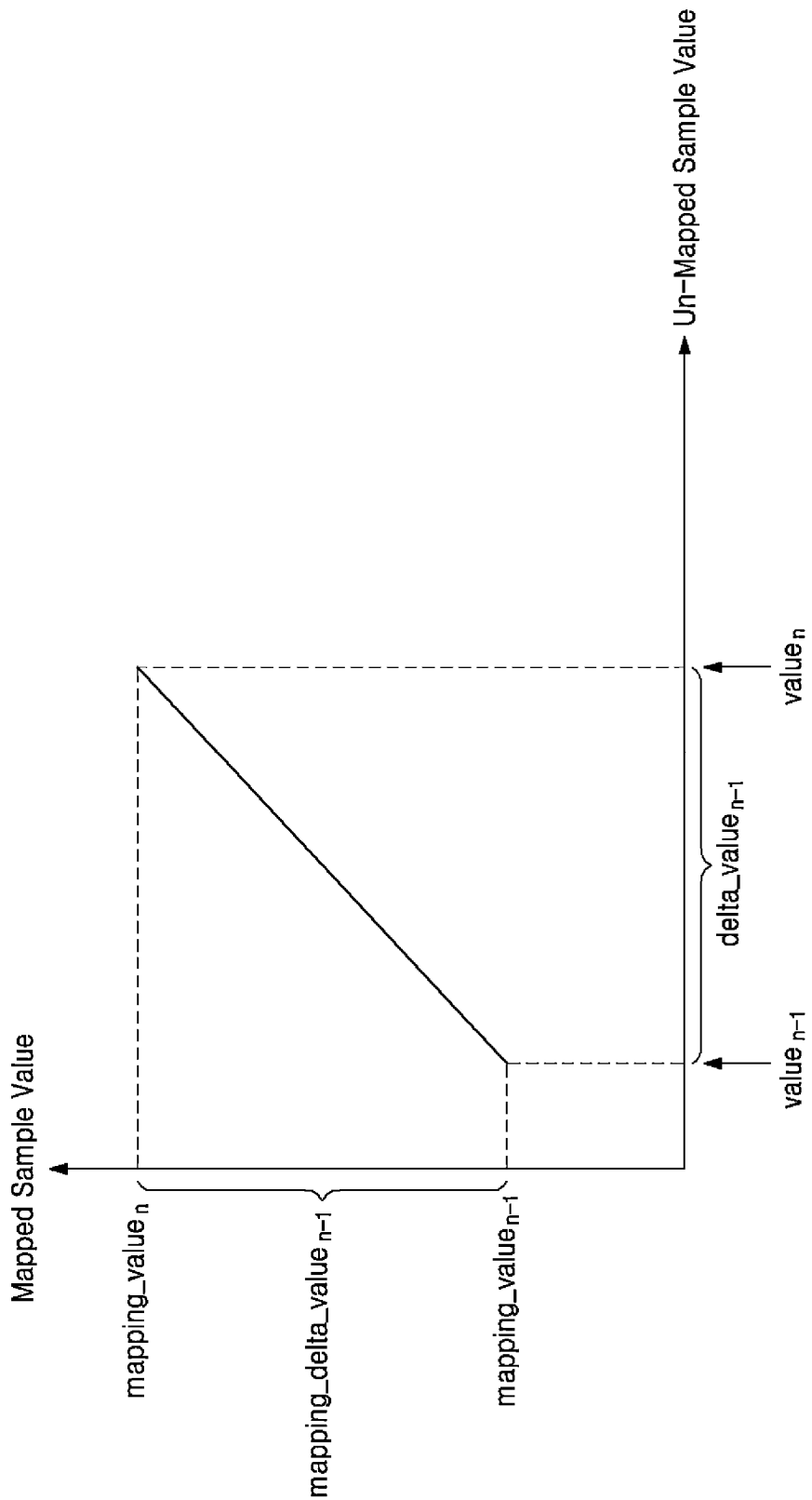
Figure 12C:
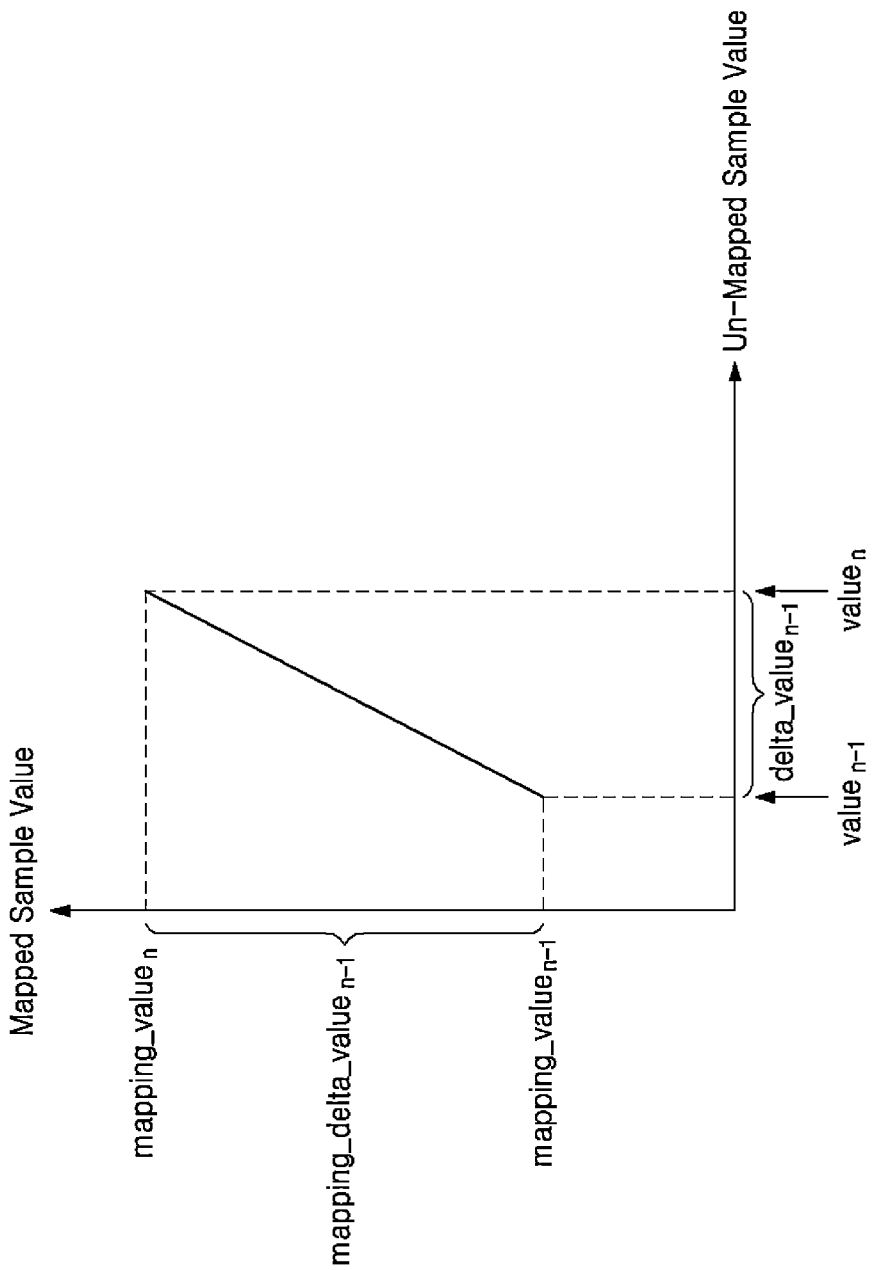
Figure 12D:
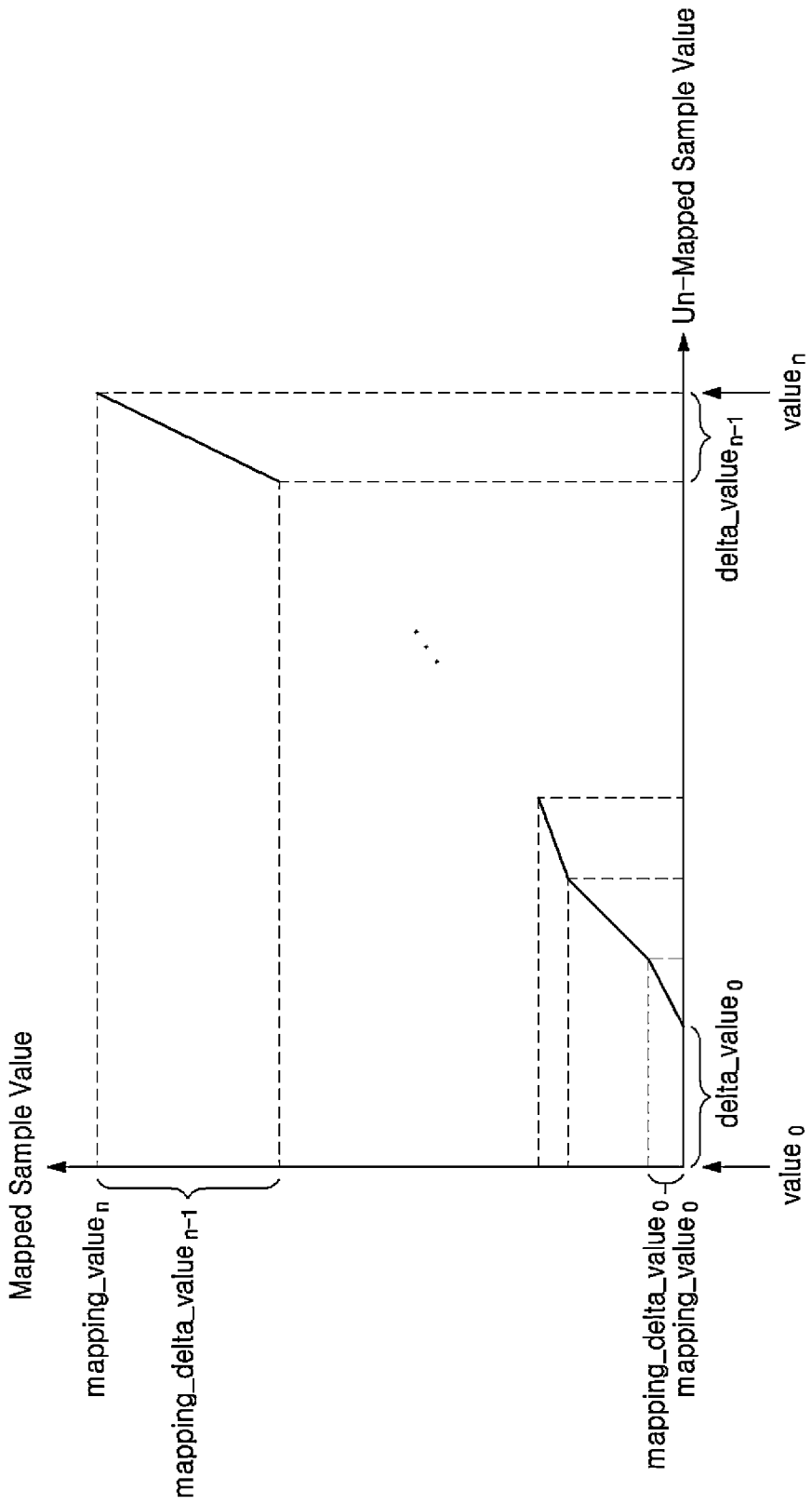

The example of FIG. 12A illustrates a case where the un-mapped sample values and the mapped sample values have the same interval. The example of FIG. 12B illustrates a case where the interval of the un-mapped sample values is wider than the interval of the mapped sample values. The example of FIG. 12C illustrates a case where the interval of the un-mapped sample values is narrower than the interval of the mapped sample values. Although it may vary depending on the distribution of the samples, if the interval of the un-mapped sample values is wider than that of the mapped sample values, as in the example of FIG. 12B, the mapping process alone may cause a loss of signals. Additionally, after the un-mapped sample range is divided into a predetermined number of mapping intervals, each interval of n (0≤k≤n−1) intervals may have a separate mapping relation, as shown in the example of FIG. 12D.

Meanwhile, in terms of optimizing the coding efficiency, the video encoding device may determine a mapping relation and an inverse mapping relation. Then, the video encoding device may send the video decoding device information about the determined mapping relations (hereinafter, mapping data).

The mapping data may include, for the un-mapped samples, all or some of a minimum sample value, a maximum sample value, the number of un-mapped intervals, or the size of each interval. Further, the mapping data may include, for the mapping samples, all or some of a minimum sample value, a maximum sample value, the number of mapping intervals, or the size of each mapping interval. In this case, the size of each interval dividing between the maximum sample value and the minimum sample value of the un-mapped range may or may not be the same. Further, the number of mapping intervals may be the same as the number of un-mapped intervals, but the sizes of their respective mapping intervals may or may not be the same.

When the mapping relation as described above is to be applied (Yes in S1002), the deblocking filter 182 performs the following steps.

The deblocking filter 182 calculates a mapping offset (S1004).

The deblocking filter 182 decodes the mapping data, which is information on the mapping relation. The deblocking filter 182 may use the sizes of the intervals associated with the target pixels from the mapping data to calculate a gradient value, mapping_grad$_k$ (0≤k≤nn−1, nn≤n) for each interval and then may use the average of the calculated gradient values to calculate a mapping_offset. The gradient value for each interval and the mapping offset may be calculated as shown in Equation 1.

$$\text{mapping\_grad}_k = \text{delta\_value}_k / \text{mapping\_data\_value}_k \quad \text{[Equation 1]}$$

$$\text{mapping\_offset} = \left( A \times \frac{\sum_{0}^{nn-1} \text{mapping\_grad}_k}{nn} - 1 + B \right) \ll (\text{bit\_depth}_B - \text{bit\_depth}_A)$$

Here, delta_value$_k$ (0≤k≤nn−1) denotes the size of each un-mapped interval and mapping_delta_value$_k$ (0≤k≤nn−1) denotes the size of each mapping interval.

A and B are correction factors, which may be constants. The correction factors may have fixed values according to an arrangement between the video encoding device and the video decoding device. Alternatively, the correction factors may be transmitted from the video encoding device to the video decoding device. For transmission, the video encoding device may calculate the correction factors by using the characteristics of the original video and the variance of the distribution of the un-mapped samples. If no transmission is made, A may be automatically set to 1 and B may be automatically set to 0.

Alternatively, obviating the need for transmission, the video encoding device and the video decoding device may calculate the correction factors in the same manner by using the characteristics of the decoded signals and the variance of the distribution of the decoded residual samples. In this case, depending on the unit used for transmitting the mapping relation, the deblocking filter 182 may use the correction factors calculated in an already decoded reference image, an Instant Decoding Refresh (IDR) image/slice of a Group of Pictures (GOP) containing the decoded current picture, or a CTU (Coding Tree Unit) adjacent to the CTU containing the current block. For example, if the mapping relation is transmitted in the unit of a picture, the correction factors may be determined based on the signal characteristics and dispersion of the reference picture of the current block or the IDR picture of the GOP containing that block. Alternatively, if the information about the mapping relation is transmitted on a CTU-by-CTU basis, the deblocking filter 182 may use, in determining the correction factors, the characteristics or dispersion of neighboring CTUs already decoded in the decoded current picture, in addition to the IDR picture or reference picture.

Figure 13:
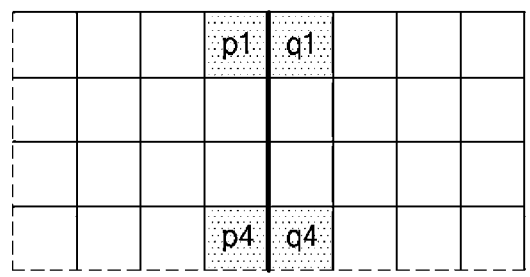
FIG. 13 is a diagram illustrating sample locations utilized to determine a mapping offset, according to at least one embodiment of the present disclosure.

In another embodiment, the deblocking filter 182 may use a mapping relation of a predetermined number of sample locations centered on the filtering boundary instead of taking the entire target pixels. For example, to determine the mapping offset, the deblocking filter 182 may reference the four sample locations p1, p4, q1, and q4 as illustrated in FIG. 13. The deblocking filter 182 may calculate interval-specific gradient values by using the sizes of the intervals associated with the preset samples and then may calculate the mapping offset by using the average of the calculated gradient values. Thus, in the example shown in FIG. 13, the number of calculated gradient values is four or less. Meanwhile, the sample positions may vary depending on the size of the unit block that determines the strength of the deblocking filter, the size of the predicted block, the size of the quantized block, the range to which the same deblocking filter is applied and the like.

The deblocking filter 182 determines the strength of the deblocking filtering based on the mapping offset (S1006).

The deblocking filter 182 may add the average of the quantization parameters of two blocks and the mapping offset to calculate the quantization parameters at the boundary between the blocks and then derive β and $t_c$ based on the calculated boundary quantization parameters. Hereinafter, β and $t_c$ are referred to as dependent parameters.

The deblocking filter 182 determines the strength of the deblocking filtering based on the dependent parameters. The dependent parameters may be utilized in the derivation of thresholds used to determine the strength of the deblocking filtering. For example, the deblocking filtering may take strong or weak strength.

According to Equation 1, the gradient value increases as the interval of the un-mapped sample values is wider than that of the mapped sample values. As the gradient values increase, the mapping offset increases, which increases the magnitude of the quantization parameter at the boundary. As the size of the boundary quantization parameter increases, the size of the dependent parameters also increases, which in turn increases the thresholds used to determine the strength of the deblocking filtering. These increasing thresholds may accompany the increased likelihood of the deblocking filtering taking a stronger strength. The deblocking filter 182 may compensate for the loss of signals due to the mapping process by utilizing stronger strength deblocking filtering when the interval of the un-mapped sample values is wider than that of the mapped sample values.

The deblocking filter 182 determines a filter (S1008). The deblocking filter 182 may determine the filter by using filtering strength and dependent parameters. The dependent parameters may be utilized in the derivation of the thresholds used to determine the filter. For example, the deblocking filter 182 may determine as the filter one of a short strong filter, a short weak filter, or a long filter.

The deblocking filter 182 performs deblocking filtering (S1010). The deblocking filter 182 may use the determined filter to perform deblocking filtering on the target pixels for the deblocking filtering.

In contrast, when the mapping relation is not applied (No in S1002), the deblocking filter 182 may determine the strength of the deblocking filtering (S1020) and then may perform the subsequent Steps S1008 and S1010. In determining the strength of the deblocking filtering, no mapping offset is utilized. The deblocking filter 182 may average the quantization parameters of two blocks to calculate a quantization parameter at the boundary between the blocks and then, based on the calculated boundary quantization parameter, may derive the dependent parameters ß and to.

In addition to the mapping-based image encoding method or image decoding method changing the characteristics of the pixel values around the boundaries between blocks in the reconstructed image, the mapping-based image encoding method or image decoding method may also change the characteristics of the pixel values inside the blocks. Therefore, the SAO filter 184 may use an edge offset or a band offset to perform offset filtering on pixels within the target block, which underwent deblocking filtering.

Figure 14:
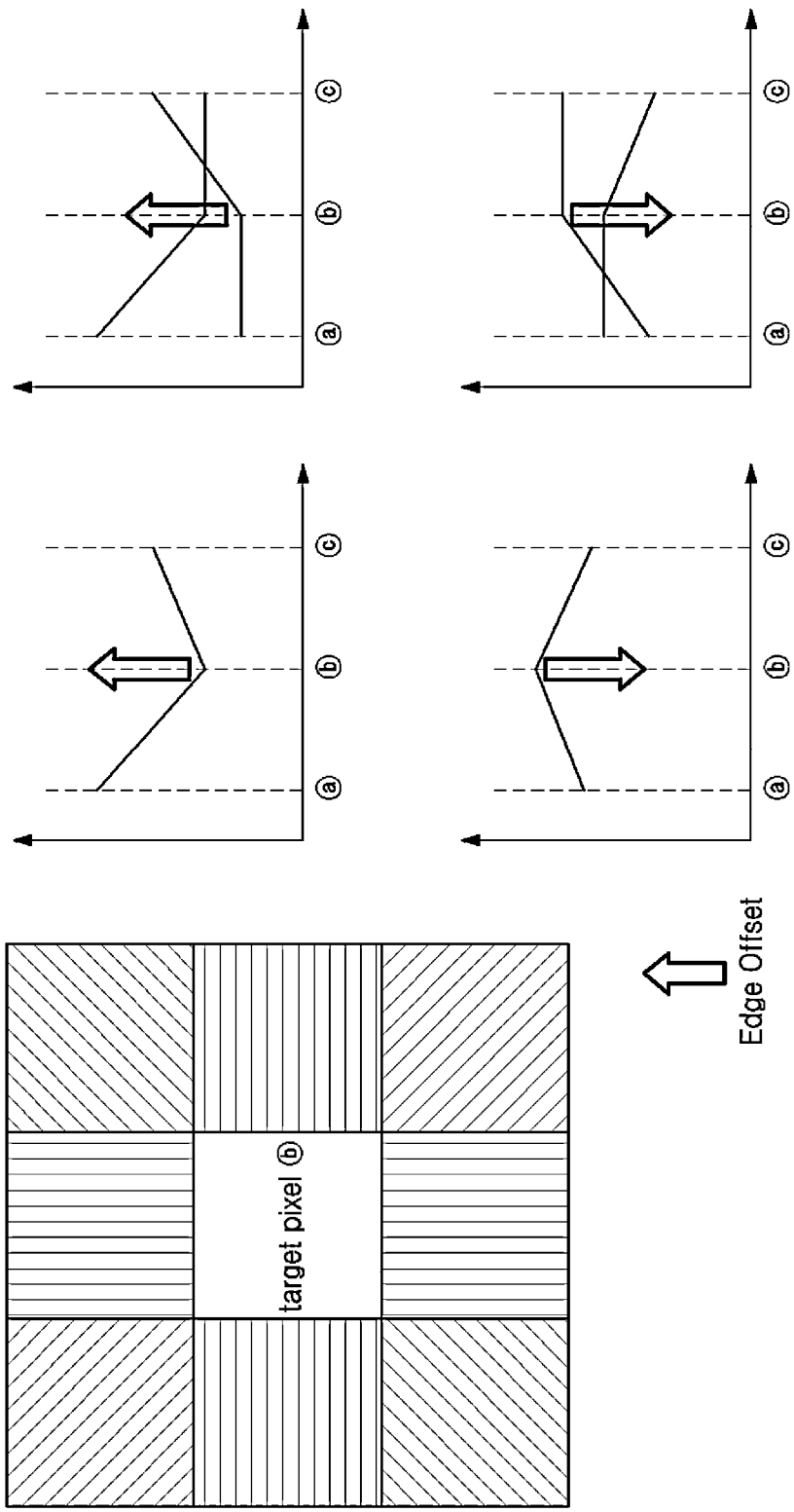
FIG. 14 is a diagram illustrating offset filtering utilizing an edge offset.

The edge offset filtering may be performed as shown in the example of FIG. 14 by establishing four categorized shapes of magnitude between the target pixel to be filtered and the neighboring 8-directional pixel values, and applying the same offset to each shape.

Figure 15:
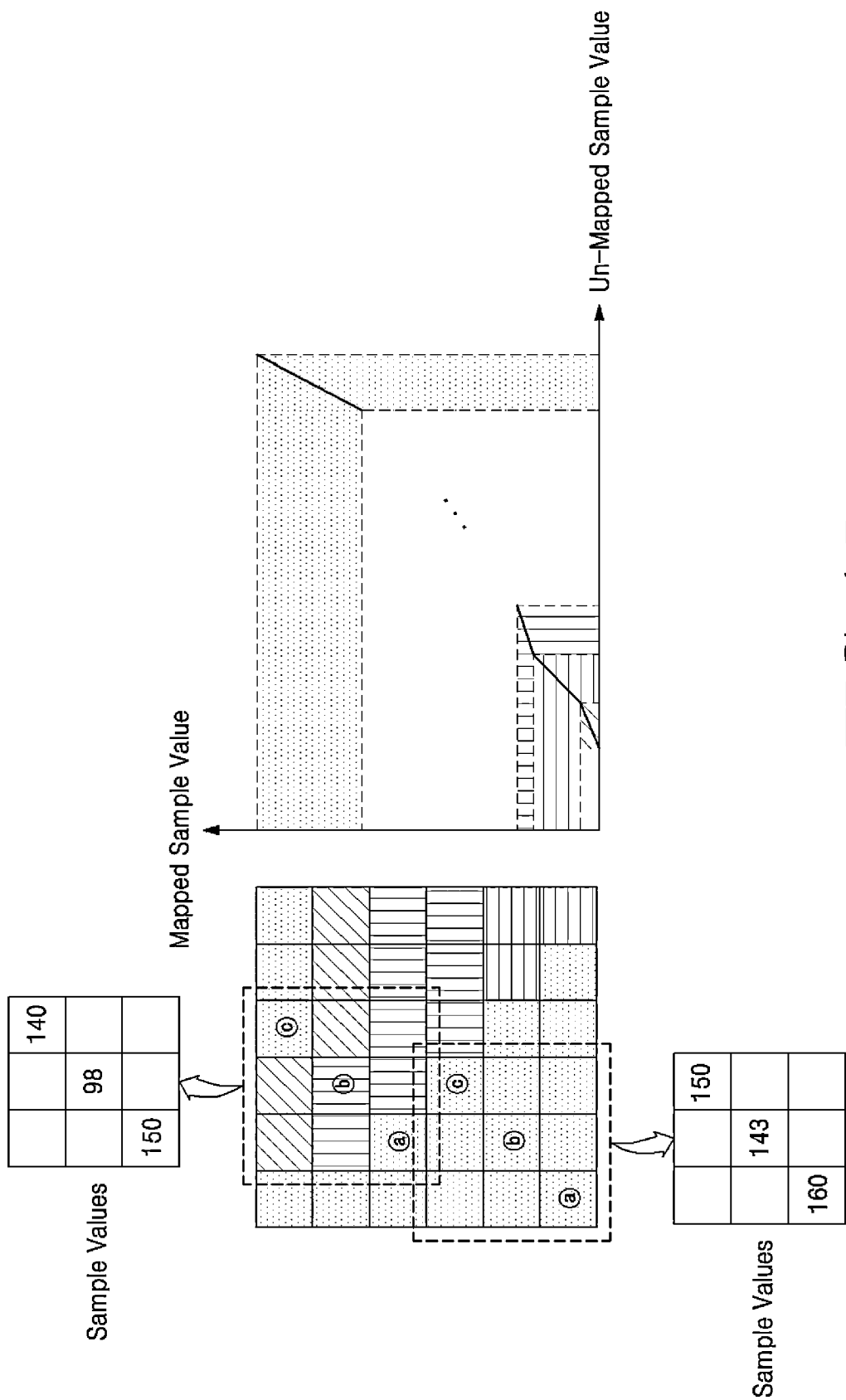
FIG. 15 is a diagram illustrating offset filtering utilizing an edge offset, according to at least one embodiment of the present disclosure.

FIG. 15 is a diagram illustrating offset filtering utilizing an edge offset, according to at least one embodiment of the present disclosure.

With the mapping relations of the respective pixels distributed inside the target block as illustrated in FIG. 15, for example, with pixel values ⓐ, ⓑ, and ⓒ distributed in the two 3×3 blocks, the edge offsets may be accordingly categorized. This classification of edge offsets coincides with the classification as illustrated in FIG. 14, so that the same offset may be applied based on the classification of the edge offsets. Hereinafter, pixel ⓑ is denoted as the target pixel, whereas pixel ⓐ and pixel ⓒ are denoted as the neighboring pixels of the target pixel. With pixel ⓑ as a center, pixels ⓐ, ⓑ, and ⓒ form a row. The offset filtering according to this embodiment can adaptively apply an offset to the same classification according to the mapping relation of the target pixel, as shown in Equation 2.

[Equation 2]

$$saoPicture[xS_i][yS_j] = Clip3(0, (1 \ll BitDepth) - 1, recPicture[xS_i][yS_j] + int(SaoOffsetVal[cIdx][rx][ry][edgeIdx] \times mapping\_grad_k))$$

Here, cIdx is an index indicating the color information of a pixel, such as Y, Cb, Cr, and the like, and edgeIdx is an index indicating one of the edge offsets, as illustrated in FIG. 14. mapping_grad$_k$ is a weight applied to SaoOffsetVal, indicating the gradient value of the interval related to the target pixel. The mapping_grad$_k$ may be applied in the form of a mapping table.

According to Equation 1, the gradient value increases as the interval of the un-mapped sample values is wider than that of the mapped sample values. The edge offset filtering may be responsive to when the interval of the un-mapped sample values is wider than that of the mapped sample values for utilizing increased weights to compensate for the loss of signals due to the mapping process.

Figure 16:
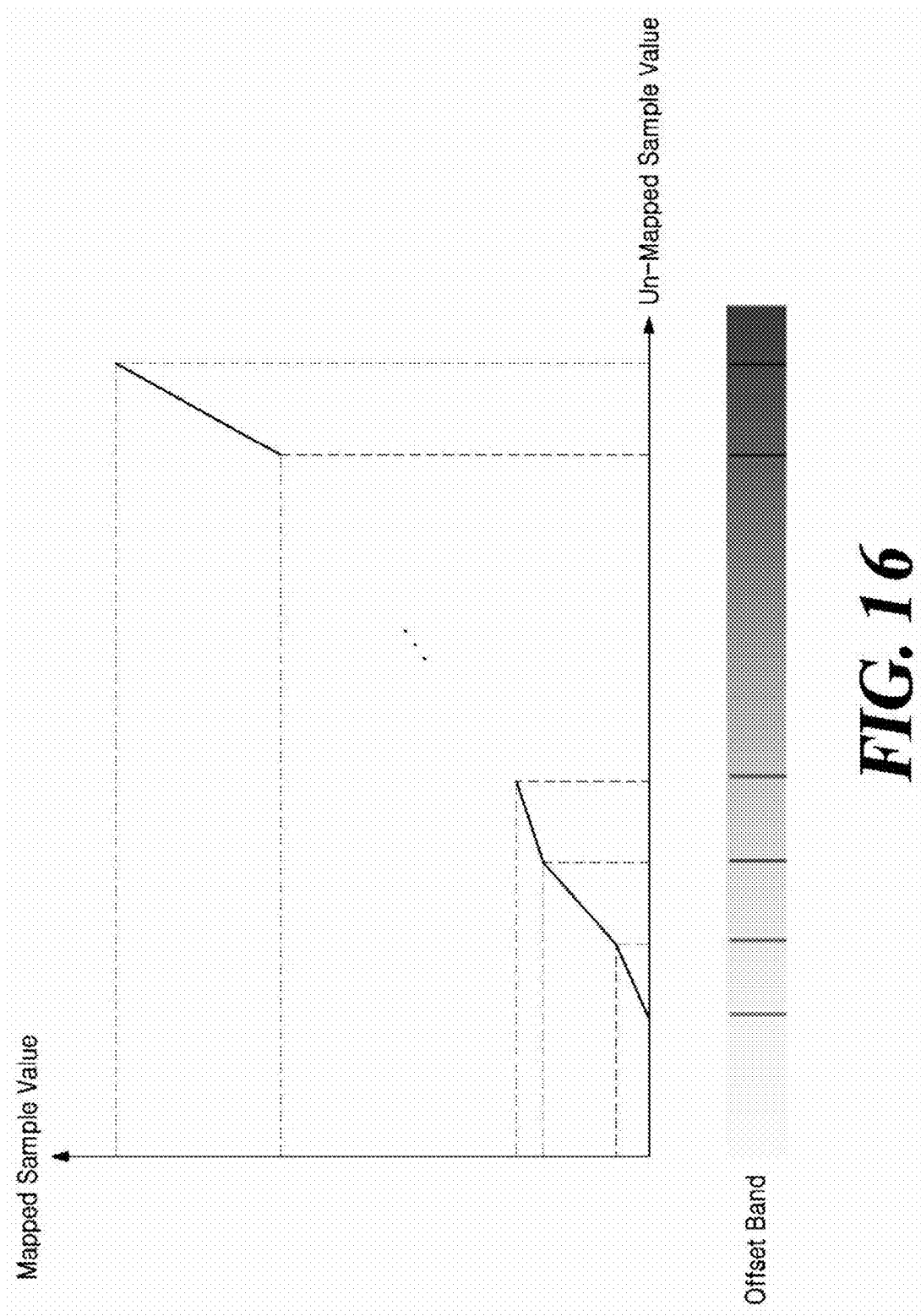
FIG. 16 is a diagram illustrating offset filtering utilizing a band offset, according to at least one embodiment of the present disclosure.

FIG. 16 is a diagram illustrating offset filtering utilizing a band offset, according to at least one embodiment of the present disclosure.

The band intervals that are subject to the application of the band offset may be divided as equally with the mapping intervals, as illustrated in FIG. 16. The video encoding device may signal the band offset for each divided interval. In another embodiment, the band offsets may be applied to a predetermined number of consecutive intervals, along with information on the beginning interval for the application of the band offset. Alternatively, a band offset may be selectively applied to each interval according to an interval-specific flag.

Tables 1, 2, and 3 below describe syntaxes representing edge offsets and band offsets according to embodiments.

As information on the edge offset, as shown in Tables 1, 2, and 3, one value is transmitted for each category illustrated in FIG. 14. The video encoding device or the video decoding device may adaptively perform edge offset filtering by using mapping_grad$_k$, which is the gradient value of the interval associated with the target pixel, as shown in Equation 2.

As information on the band offset, the sign and absolute value of the offset may be signaled for all offset band intervals, as shown in Table 1.

TABLE 1

| sao_data( ) | |
|---|---|
| . | |
| . | |
| . | |
| if( SaoTypeIdx != 0 ) {   //sao is applied | |
|   if( SaoTypeIdx = = edge_offset ) | |
|     for( i = 0; i< 4; i++ ) | |
|       sao_offset_abs[i] | ae(v) |
|   else if( SaoTypeIdx = = band_offset) | |
|     for( i = 0; i < n ; i++ ) | |
|       sao_offset_sign_flag[i] | ae(v) |
|   sao_offset_abs[i] | ae(v) |
| } | |

Alternatively, as shown in Table 2, signaled may be the location to begin applying the band offset, the number of successive band offset-applied intervals, and the absolute value and sign of the offset for each interval according to that number of intervals.

TABLE 2

```
sao_data( )
    .
    .
    .
    if( SaoTypeIdx != 0 ) {   //sao is applied
    if( SaoTypeIdx = = edge_offset )
        for( i = 0; i< 4; i++ )
            sao_offset_abs[i]                       ae(v)
        else if( SaoTypeIdx = = band_offset)
            sao_band_position[cIdx][rx][ry]         ae(v)
            band_num                                ae(v)
            for( i = 0; i < band_num; i++ )
                sao_offset_sign_flag [i]            ae(v)
    sao_offset_abs [i]                              ae(v)
    }
```

Alternatively, as shown in Table 3, for each interval of the offset bands, a flag indicating whether the offset value is enabled or disabled may first be signaled. Then, if that flag is true, the absolute value and sign of the offset may be signaled.

TABLE 3

```
sao_data( )
    .
    .
    .
    if( SaoTypeIdx != 0 ) {   //sao is applied
    if( SaoTypeIdx = = edge_offset )
        for( i = 0; i< 4; i++ )
            sao_offset_abs[i]                       ae(v)
        else if( SaoTypeIdx = = band_offset)
            for( i = 0; i < n; i++ )
    sao_offset_flag [i]                             ae(v)
    if sao_offset_flag !=0 {
        sao_offset_sign_flag [i]                    ae(v)
        sao_offset_abs [i]                          ae(v)
    }
    }
```

In Tables 1, 2, and 3, ac (v) denotes a syntax element to which the CABAC method is applied.

Hereinafter, with reference to FIGS. 17 and 18, in-loop filtering methods performed by the video encoding device or the video decoding device are described.

Figure 17:
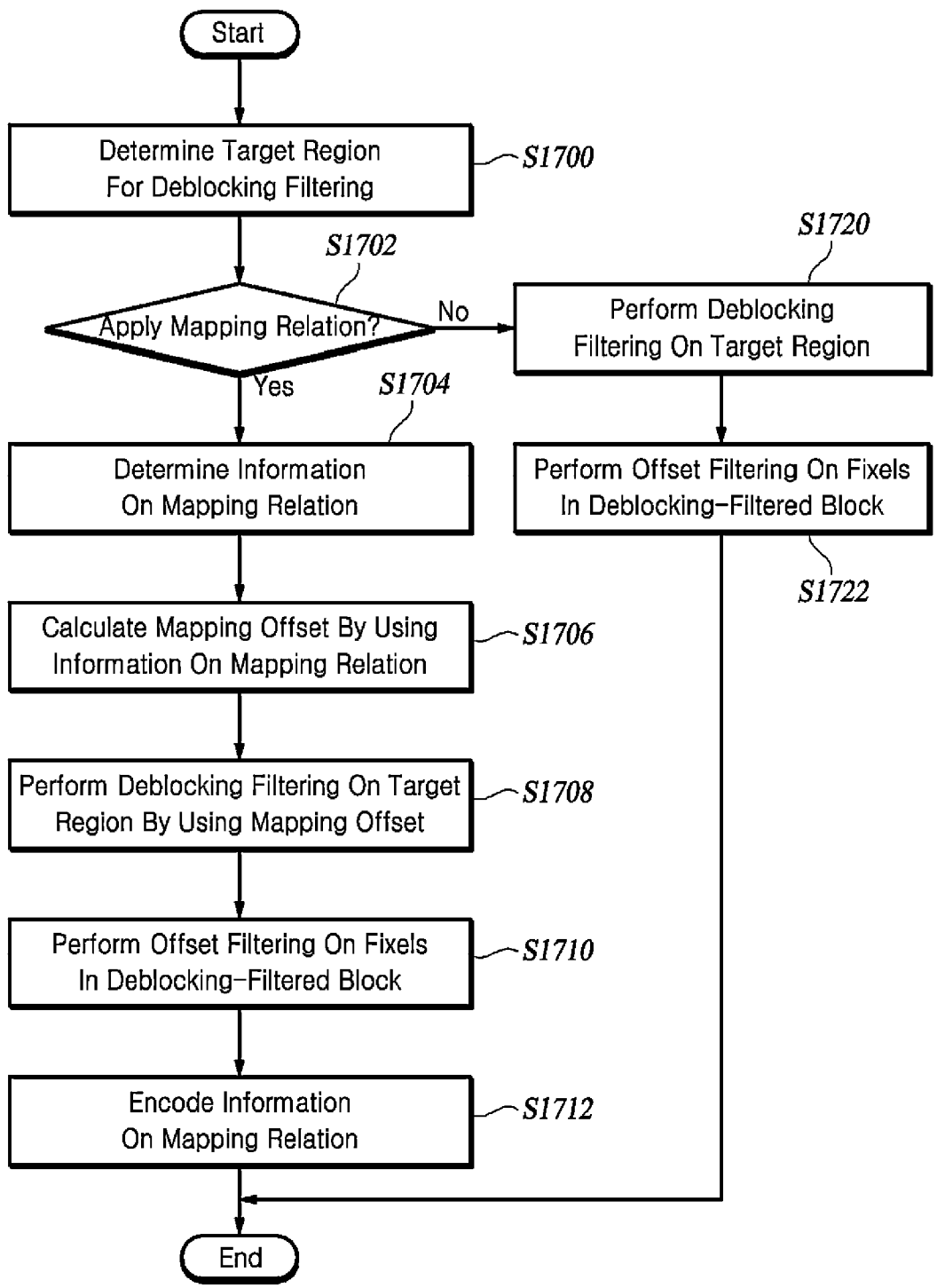
FIG. 17 is a flowchart of an in-loop filtering method performed by a video encoding device, according to at least one embodiment of the present disclosure.

FIG. 17 is a flowchart of an in-loop filtering method performed by the video encoding device, according to at least one embodiment of the present disclosure.

The video encoding device determines a target region for deblocking filtering centered on a boundary between blocks in the reconstructed image (S1700).

The video encoding device determines whether a mapping relation is to be applied to the pixels in the target region (S1702). For example, the video encoding device may determine and then may use a flag indicating whether to apply the mapping relation. The mapping relation may be applied to sample values in the original range or sample values in the residual range for the reconstructed image.

When the mapping relation is to be applied (Yes in S1702), the video encoding device performs the following steps.

The video encoding device determines information on the mapping relation (S1704).

The information on the mapping relation, i.e., the mapping data, may include, for the un-mapped samples, all or some of the minimum sample value, the maximum sample value, the number of un-mapped intervals, or the size of each interval. Further, the mapping data may include, for the mapping samples, all or some of the minimum sample value, the maximum sample value, the number of mapping intervals, or the size of each mapping interval.

The video encoding device calculates a mapping offset by using the information on the mapping relation (S1706).

The video encoding device derives correction factors. The video encoding device may use the information on the mapping relation, in particular, the sizes of the intervals associated with all or some of the pixels in the target region to calculate gradient values for those intervals. The video encoding device may calculate a mapping offset by using the gradient values and the correction factors.

The video encoding device performs deblocking filtering on the target region by using the mapping offset (S1708). The video encoding device may perform the deblocking filtering by using Steps S1006, S1008, and S1010 above.

The video encoding device performs offset filtering on the pixels in the block that underwent the deblocking filtering (S1710).

The video encoding device encodes the information on the mapping relation (S1712).

On the contrary, when the mapping relation is not to be applied (No in S1702), the video encoding device performs the following steps.

The video encoding device performs deblocking filtering on the target region (S1720). The video encoding device may perform the deblocking filtering by using Steps S1020, S1008, and S1010 described above.

The video encoding device performs offset filtering on the pixels in the block that underwent the deblocking filtering (S1722).

Figure 18:
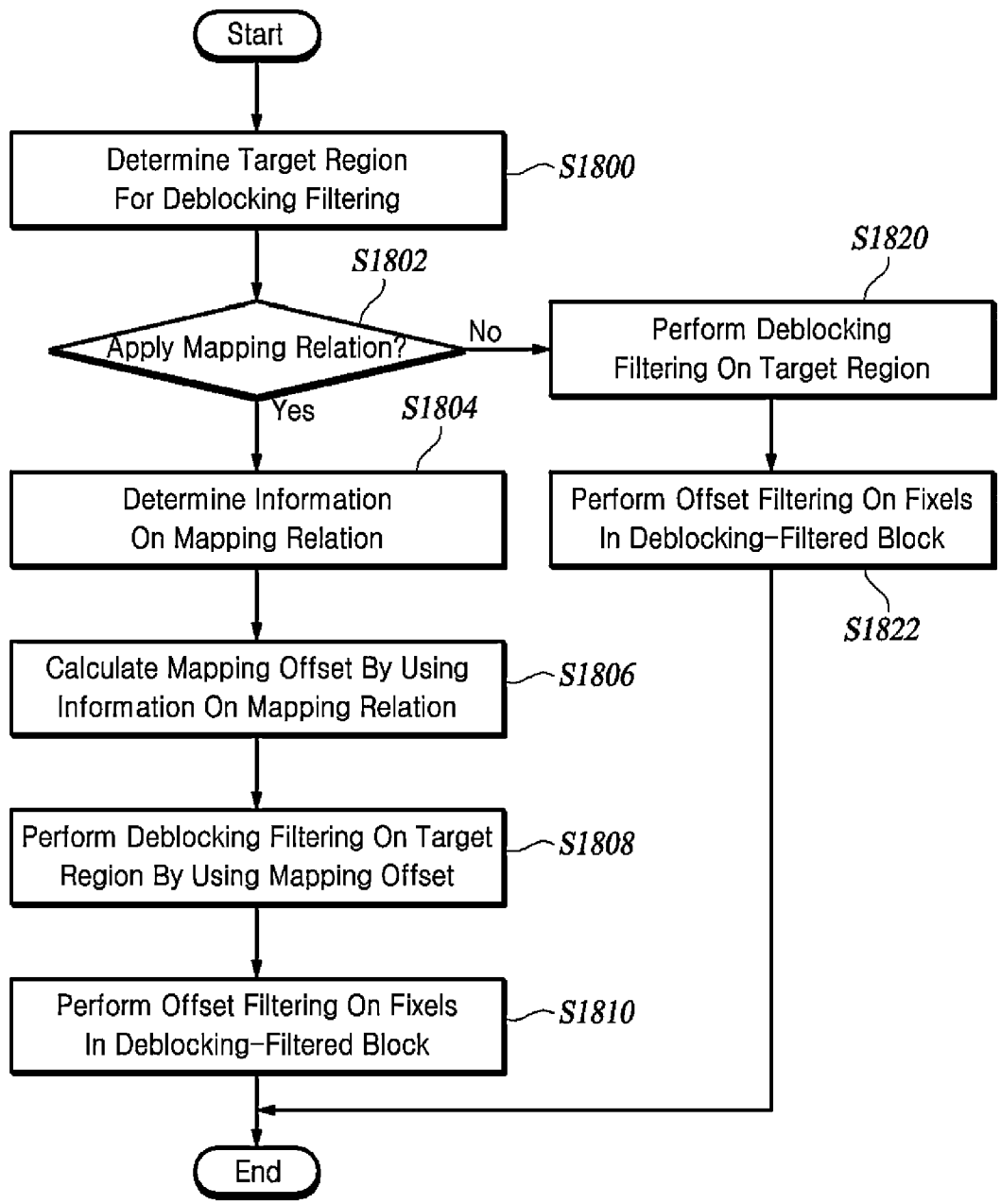
FIG. 18 is a flowchart of an in-loop filtering method performed by a video decoding device, according to at least one embodiment of the present disclosure.

FIG. 18 is a flowchart of an in-loop filtering method performed by the video decoding device, according to at least one embodiment of the present disclosure.

The video decoding device determines a target region for deblocking filtering centered on a boundary between blocks in the reconstructed image (S1800).

The video decoding device determines whether a mapping relation is to be applied to the pixels in the target region (S1802). For example, the video decoding device may decode a flag indicating whether to apply the mapping relation, and then may check the flag. The mapping relation may be applied to sample values in the original range or sample values in the residual range for the reconstructed image.

When the mapping relation is to be applied (Yes in S1802), the video decoding device performs the following steps.

The video decoding device decodes the information on the mapping relation (S1804).

The video decoding device calculates a mapping offset by using the information on the mapping relation (S1806).

The video decoding device derives correction factors. The video decoding device utilizes the information on the mapping relation, in particular, its size data of the intervals associated with all or some of the pixels in the target region to calculate gradient values for those intervals. The video decoding device may calculate the mapping offset by using the gradient values and the correction factors.

The video decoding device performs deblocking filtering on the target region by using the mapping offset (S1808). The video decoding device may perform the deblocking filtering by using Steps S1006, S1008, and S1010 described above.

The video decoding device performs offset filtering on the pixels in the deblocking-filtered block (S1810).

On the contrary, when the mapping relation is not to be applied (No in S1802), the video decoding device performs the following steps.

The video decoding device performs deblocking filtering on the target region (S1820). The video decoding device may perform the deblocking filtering by using Steps S1020, S1008, and S1010 described above.

The video decoding device performs offset filtering on the pixels in the deblocking-filtered block (S1822).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

180: loop filter unit
182: deblocking filter
184: SAO filter
560: loop filter unit
562: deblocking filter
564: SAO filter

What is claimed is:

1. A method of performing in-loop filtering by a video decoding device, the method comprising:
   determining a target region for deblocking filtering centered on a boundary between blocks in a reconstructed image; and
   determining whether a mapping relation is to be applied to pixels in the target region,
   wherein, when the mapping relation is applied, the method further comprises
   decoding information on the mapping relation,
   calculating a mapping offset by using the information on the mapping relation, and
   performing the deblocking filtering on the target region by using the mapping offset,
   wherein calculating the mapping offset includes
   deriving correction factors,
   calculating gradient values of intervals that are associated with all or some of the pixels in the target region by using sizes of the intervals out of the information on the mapping relation, and
   calculating the mapping offset by using the gradient values and the correction factors,
   wherein the correction factors are calculated by a video encoding device using a characteristic of an original video and a variance based on a distribution of unmapped samples.

2. The method of claim 1, further comprising, when the mapping relation is applied:
   performing offset filtering on pixels in a block on which the deblocking filtering is performed.

3. The method of claim 1, wherein the mapping relation is applied to sample values in an original range or sample values in a residual range about the reconstructed image.

4. The method of claim 1, wherein performing the deblocking filtering includes:
   determining a strength of the deblocking filtering based on the mapping offset;
   determining a filter based on the strength of the deblocking filtering; and
   applying the filter to pixels in the target region.

5. The method of claim 4, wherein determining the strength of the deblocking filtering includes:
   calculating a quantization parameter at the boundary by using quantization parameters of the blocks and the mapping offset;
   deriving dependent parameters on the quantization parameter at the boundary; and
   determining the strength of the deblocking filtering based on the dependent parameters.

6. The method of claim 5, wherein determining the filter includes:
   determining the filter by using the dependent parameters and the strength of the deblocking filtering.

7. The method of claim 2, wherein performing the offset filtering on pixels includes:
   when edge offset filtering is used, with respect to a target pixel and two surrounding pixels, determining an edge offset of the target pixel based on a distribution of pixel values according to the mapping relation, wherein the target pixel and the two surrounding pixels are present in a row centered on the target pixel.

8. The method of claim 7, wherein performing the offset filtering on pixels includes:
   adaptively factoring a gradient value of an interval associated with the target pixel in determining of the edge offset.

9. The method of claim 2, wherein performing the offset filtering on pixels includes:
   when band offset filtering is used, dividing intervals that are subject to a band offset as equally with mapping intervals according to the mapping relation, and applying the band offset to each of the intervals.

10. The method of claim 1, further comprising, when the mapping relation is not applied:
- performing the deblocking filtering on the target region; and
- performing offset filtering on pixels in a block on which the deblocking filtering is performed.

11. A method of performing in-loop filtering by a video encoding device, the method comprising:
- determining a target region for deblocking filtering centered on a boundary between blocks in a reconstructed image; and
- determining whether a mapping relation is to be applied to pixels in the target region,
- wherein, when the mapping relation is applied, the method further comprises
  - determining information on the mapping relation,
  - calculating a mapping offset by using the information on the mapping relation,
  - performing the deblocking filtering on the target region by using the mapping offset, and
  - encoding the information on the mapping relation,
- wherein calculating the mapping offset includes
  - deriving correction factors,
  - calculating gradient values of intervals that are associated with all or some of the pixels in the target region by using sizes of the intervals out of the information on the mapping relation, and
  - calculating the mapping offset by using the gradient values and the correction factors, and
- wherein the correction factors are calculated by a video encoding device using a characteristic of an original video and a variance based on a distribution of unmapped samples.

12. The method of claim 11, further comprising, when the mapping relation is applied:
- performing offset filtering on pixels in a block on which the deblocking filtering is performed.

13. The method of claim 11, further comprising, when the mapping relation is not applied:
- performing the deblocking filtering on the target region; and
- performing offset filtering on pixels in a block on which the deblocking filtering is performed.

14. A method for providing a video decoding apparatus with video data, the method comprising:
- encoding the video data into a bitstream; and
- transmitting the bitstream to the video decoding device,
- wherein encoding the video data comprises:
  - determining a target region for deblocking filtering centered on a boundary between blocks in a reconstructed image; and
  - determining whether a mapping relation is to be applied to pixels in the target region,
- wherein, when the mapping relation is applied, the video encoding method further comprises
  - determining information on the mapping relation,
  - calculating a mapping offset by using the information on the mapping relation,
  - performing the deblocking filtering on the target region by using the mapping offset, and
  - encoding the information on the mapping relation,
- wherein calculating the mapping offset includes
  - deriving correction factors,
  - calculating gradient values of intervals that are associated with all or some of the pixels in the target region by using sizes of the intervals out of the information on the mapping relation, and
  - calculating the mapping offset by using the gradient values and the correction factors, and
- wherein the correction factors are calculated by a video encoding device using a characteristic of an original video and a variance based on a distribution of unmapped samples.

* * * * *